United States Patent
Sangu

(10) Patent No.: US 11,467,388 B2
(45) Date of Patent: Oct. 11, 2022

(54) OBJECTIVE OPTICAL SYSTEM AND MICROSCOPE SYSTEM WITH LIQUID INTERPOSED BETWEEN LIQUID CONTACT SURFACE AND SAMPLE

(71) Applicant: Yokogawa Electric Corporation, Musashino (JP)

(72) Inventor: Hiroyuki Sangu, Tokyo (JP)

(73) Assignee: YOKOGAWA ELECTRIC CORPORATION, Musashino (JP)

( * ) Notice: Subject to any disclaimer, the term of this patent is extended or adjusted under 35 U.S.C. 154(b) by 235 days.

(21) Appl. No.: 16/954,399

(22) PCT Filed: Nov. 21, 2018

(86) PCT No.: PCT/JP2018/042979
§ 371 (c)(1),
(2) Date: Jun. 16, 2020

(87) PCT Pub. No.: WO2019/123958
PCT Pub. Date: Jun. 27, 2019

(65) Prior Publication Data
US 2021/0080708 A1    Mar. 18, 2021

(30) Foreign Application Priority Data
Dec. 18, 2017    (JP) .............................. JP2017-242140

(51) Int. Cl.
*G02B 21/00*    (2006.01)
*G02B 21/04*    (2006.01)
(Continued)

(52) U.S. Cl.
CPC ........... *G02B 21/04* (2013.01); *G02B 21/365* (2013.01); *G01B 9/02063* (2013.01)

(58) Field of Classification Search
CPC .. G01B 9/02063; G02B 21/04; G02B 21/365; G02B 21/00; G02B 21/0004;
(Continued)

(56) References Cited

U.S. PATENT DOCUMENTS

| 5,956,141 A | 9/1999 | Hayashi |
| 2006/0023301 A1 | 2/2006 | Dietrich et al. |

(Continued)

FOREIGN PATENT DOCUMENTS

| EP | 2017662 A2 | 1/2009 |
| EP | 2579100 A2 | 4/2013 |

(Continued)

OTHER PUBLICATIONS

Wang, et al., "Reflection-mode optical-resolution photoacoustic microscopy based on a reflective objective", Optics Express, 2013, vol. 21, No. 20, pp. 24210-24218, cited in Specification (9 pages).

*Primary Examiner* — Arnel C Lavarias
(74) *Attorney, Agent, or Firm* — WHDA, LLP

(57) ABSTRACT

An objective optical system (43) includes: a reflection surface (RS1) which reflects light traveling toward a sample (SP); a reflection surface (RS2) which reflects light reflected by the reflection surface (RS1) toward the sample (SP); and a transmission portion (TS) which is disposed on an optical path of light reflected by the reflection surface (RS2), which has a liquid contact surface coming into contact with liquid (WT) interposed between the liquid contact surface and the sample (SP), and of which the liquid contact surface is formed to be substantially orthogonal to the optical path of light reflected by the reflection surface (RS2).

20 Claims, 15 Drawing Sheets

(51) Int. Cl.
    *G02B 21/36* (2006.01)
    *G01B 9/02055* (2022.01)

(58) Field of Classification Search
    CPC .............. G02B 21/002; G02B 21/0024; G02B
        21/0032; G02B 21/0076; G02B 21/02;
        G02B 21/36; G02B 21/361; G02B 17/00;
        G02B 17/02; G02B 17/06; G02B
        17/0605; G02B 17/061; G02B 17/0684;
        G02B 17/0673

USPC ....... 359/368, 362, 363, 369, 370, 385, 387,
        359/388, 642, 656, 661, 726, 727, 729,
        359/730, 731, 838, 839.85, 857, 858, 859
    See application file for complete search history.

(56) References Cited

U.S. PATENT DOCUMENTS

| | | |
|---|---|---|
| 2009/0021845 A1 | 1/2009 | Shmarev et al. |
| 2013/0083306 A1 | 4/2013 | Smirnov et al. |
| 2019/0219807 A1* | 7/2019 | Kobayashi ............. G02B 21/33 |
| 2020/0173965 A1* | 6/2020 | Sangu .................. A61B 5/0095 |

FOREIGN PATENT DOCUMENTS

| | | |
|---|---|---|
| JP | 59-19912 A | 2/1984 |
| JP | 5-323437 A | 12/1993 |
| JP | 6-148574 A | 5/1994 |
| JP | 10-89912 A | 4/1998 |
| JP | 2000-183822 A | 6/2000 |
| JP | 2006-39565 A | 2/2006 |
| JP | 2007-536539 A | 12/2007 |
| JP | 2009-44143 A | 2/2009 |
| JP | 2013-80921 A | 5/2013 |
| JP | 2016-101424 A | 6/2016 |
| WO | 2015/129293 A1 | 9/2015 |

* cited by examiner

OBJECTIVE OPTICAL SYSTEM AND MICROSCOPE SYSTEM WITH LIQUID INTERPOSED BETWEEN LIQUID CONTACT SURFACE AND SAMPLE

TECHNICAL FIELD

The present invention relates to an objective optical system and a microscope system.

BACKGROUND ART

Recently, technologies for imaging the inside of a sample, such as a tissue, an organ, a cell of a living body, as a two-dimensional image or a three-dimensional image have attracted attention. Representative examples of the technologies include an imaging technology using a confocal microscope, an imaging technology using optical coherence tomography (OCT), and an imaging technology using photoacoustic imaging. The imaging technology using a confocal microscope is a technology for imaging a sample based on fluorescence obtained by irradiating a sample using a confocal microscope with light within a wavelength range of UV light to visible light. The imaging technology using OCT is a technology for imaging a sample based on interference light resulting from interference between light, which is obtained by irradiating a sample with near infrared light, and reference light. The imaging technology using photoacoustic imaging is a technology for imaging a sample based on acoustic waves obtained from a sample in case that the sample is irradiated with a short-pulsed laser of visible light or near infrared light.

As in the cases of imaging a sample using the imaging technologies described above, in case that a sample is observed, it is desirable that observation be performed using light within an extensive wavelength range of UV light to near infrared light. Since an aberration such as a chromatic aberration occurs in objective lenses in the related art, it is difficult to cope with light having the foregoing extensive wavelength range with one objective lens. For this reason, in the related art, in case that images obtained by performing observation using light having various wavelengths are superimposed, an image obtained every time an objective lens is replaced (an image having discrepancy in observation times or discrepancy in observation places) has to be superimposed, and thus it is difficult to superimpose images of the same observation places obtained by simultaneously performing observation using light having various wavelengths, for example.

Examples of countermeasures, for resolving such a problem include a way of using a reflection objective mirror as disclosed the following Patent Literature 1 and Patent Literature 2. The reflection Objective mirror disclosed in the following Patent Literature 1 is a Schwarzschild-type reflection objective mirror, which is not a refraction system as is a lens and has an advantage in that no chromatic aberration occurs because its entirety is configured as a reflection system. In addition, regarding reflection objective mirror disclosed in the following Patent Literature 2, a Schwarzschild-type reflection objective mirror, in which a small mirror and a large mirror are respectively provided on a front surface and a rear surface of a reflection objective mirror block made of an optical material in order to withstand high water pressure, is disclosed. In the following Non-Patent Literature 1, an example of the imaging technology using photoacoustic imaging is disclosed.

CITATION LIST

Patent Literatures

[Patent Literature 1] Japanese Unexamined Patent Application, First Publication No. H6-148574
[Patent Literature 2] Japanese Unexamined Patent Application, First Publication No. H5-323437

Non-Patent Literature

[Non-Patent Literature 1] Hui Wang et al, "Reflection-mode optical-resolution photoacoustic microscopy based on a reflective objective", Optics Express Vol. 21, No. 20, p. 24210 to 24218

SUMMARY OF INVENTION

Technical Problem

Incidentally, in case that a sample (a sample of a living body) is observed, it is desirable to perform observation through liquid immersion regardless of whether an objective optical system is a refraction system or a reflection system. Main advantages of performing observation through liquid immersion are as follows. A first advantage is that since refractive indices of a liquid such as water and a sample are close to each other, there is little reflection on a surface of the sample, and thus a deep part of the sample can be observed. A second advantage is that since there is little refraction of light on a surface of a sample, an image is not distorted in a depth direction of the sample, and thus a favorable image can be obtained in case that generating a three-dimensional image of the inside of the sample, for example. A third advantage is that since a liquid has a higher refractive index than air, the number of openings in an objective lens can be increased, and thus observation can be easily performed at a high resolution.

However, in a case of performing observation through liquid immersion (for example, observation of a sample under a liquid) using the reflection objective mirror disclosed in the foregoing Patent Literature 1, light which has been reflected toward a sample by the reflection objective mirror passes through an interface between air and a liquid, and thus refraction occurs. Here, since a liquid has a higher refractive index than air, a focal position of light which has passed through a liquid is located farther than a focal position in a case of having no liquid. In addition, since the refractive index of a liquid varies in accordance with the wavelength of light, the foregoing focal position of light which has passed through a liquid varies in accordance with the wavelength, thereby causing various aberrations such as a chromatic aberration.

In addition, the reflection objective mirror disclosed in the foregoing Patent Literature 2 can be used in a state of being immersed in water, and therefore a problem as in the foregoing Patent Literature 1 (refraction in an interface between air and a liquid) does not occur. However, in the foregoing Patent Literature 2, light which has been reflected toward a sample by a reflection objective mirror passes through an interface between a reflection objective mirror block and a liquid, and thus refraction occurs. Here, since a liquid has a lower refractive index than an optical material forming a reflection objective mirror block, a focal position of light which has passed through a liquid is located closer than a focal position in a case of having no liquid. In addition, since the refractive indices of a reflection objective mirror block and a liquid vary in accordance with the wavelength of light, the foregoing focal position of light which has passed through a reflection objective mirror block and a liquid varies in accordance with the wavelength, thereby causing various aberrations such as a chromatic aberration.

In this manner, in both the reflection objective mirrors disclosed in the foregoing cited documents 1 and 2, since refraction occurs in an interface with respect to a liquid (an interface between air and water, and an interface between a reflection objective mirror block and a liquid), various aberrations such as a chromatic aberration occur. In case that such an aberration occurs, an obtained image deteriorates, thereby leading to a problem of difficulties in observation at a high resolution.

The present invention has been made in consideration of the foregoing circumstances, and an object thereof is to provide an objective optical system for liquid immersion and a microscope system, in which observation can be performed across a wide wavelength bandwidth at a high resolution without causing any chromatic aberration.

Solution to Problem

To solve the above-described problem, an objective optical system (43, 43A to 43C, 73, 73A) according to one aspect of the present invention includes: a convex reflection portion (RS1) which reflects light traveling toward a sample (SP); a concave reflection portion (RS2) which reflects light reflected by the convex reflection portion toward the sample; and a transmission portion (TS) which is disposed on an optical path of light reflected by the concave reflection portion, which has a liquid contact surface coming into contact with liquid (WT, CF) interposed between the liquid contact surface and the sample, and of which the liquid contact surface is formed to be substantially orthogonal to the optical path of light reflected by the concave reflection portion.

In addition, in the objective optical system according to one aspect of the present invention, the liquid contact surface is formed as a substantially spherical surface, and a center of curvature on the spherical surface is substantially equivalent to a focal position (P) of a reflection optical system formed of the convex reflection portion and the concave reflection portion.

In addition, in the objective optical system according to one aspect of the present invention, a radius r of curvature at an arbitrary point on the liquid contact surface satisfies a relational expression $0.7\ S \leq r \leq 1.3\ S$ in case that a distance from the point to the focal position is S.

In addition, in the objective optical system according to one aspect of the present invention, the liquid contact surface is a spherical surface or an aspherical surface.

Here, in the objective optical system according to first aspect of the present invention, the transmission portion (TS) is provided in a cover member (103, 120) having an incidence surface (103a, 120a) on which light reflected by the concave reflection portion is incident and an emission surface (103b, 120b) through which light incident on the incidence surface is emitted, and the emission surface of the cover member serves as the liquid contact surface.

In addition, in the objective optical system according to first aspect of the present invention, the incidence surface of the cover member is formed to be substantially orthogonal to the optical path of light reflected by the concave reflection portion.

In addition, in the objective optical system according to first aspect of the present invention, the convex reflection portion is formed in a middle portion on the incidence surface of the cover member, or a convex mirror (101) having the convex reflection portion is attached to the middle portion.

In addition, in the objective optical system according to first aspect of the present invention, the objective optical system includes: a lens barrel (100) which internally supports a concave mirror (102) having the concave reflection portion; and a tubular liquid holding member (104) which supports the cover member such that an internal space is partitioned by the cover member of which a first end portion (104a) is attached to an end portion of the lens barrel on an object side, and which is capable of holding a liquid in an internal space (Q1) on the second end portion side partitioned by the cover member.

In addition, in the objective optical system according to first aspect of the present invention, the objective optical further includes: a liquid supply portion (105) which supplies a liquid to the internal space on the second end portion side partitioned by the cover member.

Here, in the objective optical system according to second aspect of the present invention, the objective optical system further includes: an optical member (200) which has a first surface (200a) on which the convex reflection portion is formed in a middle portion and the transmission portion (TS) is provided in a surrounding portion, and a second surface (200b) on which light traveling toward the sample is incident on a middle portion and the concave reflection portion is formed in a surrounding portion.

In addition, in the objective optical system according to second aspect of the present invention, the objective optical system further includes: a lens barrel (100) which internally supports the optical member having the first surface toward the object side.

In addition, in the objective optical system according to second aspect of the present invention, the objective optical system further includes: a tubular liquid holding member (202) of which a first end portion (202a) is attached to an end portion of the lens barrel on an object side and which is capable of holding a liquid in an internal space.

In addition, in the objective optical system according to second aspect of the present invention, the objective optical system further includes: a liquid introduction portion (203) which introduces a liquid into the internal space.

In addition, in the objective optical system according to one aspect of the present invention, a central portion (CA) of the convex reflection portion has a lower reflection factor than other parts of the convex reflection portion.

In addition, in the objective optical system according to one aspect of the present invention, the objective optical system further includes: a reference light reflection portion (211, 224) which reflects a part of the light and returns the part of the light to a side opposite to the sample as reference light for causing optical interference.

In addition, in the objective optical system according to one aspect of the present invention, an optical path length to the reference light reflection portion (211, 224) and an optical path length to the focal position (P) differ from each other.

In addition, in the objective optical system according to one aspect of the present invention, the reference light reflection portion (211, 224) is provided on the incidence surface (103*a*) of the transmission portion (TS) and reflects a part of light incident on the incidence surface (103*a*).

In addition, in the objective optical system according to one aspect of the present invention, the objective optical system further includes: a detector (111, 201) which is provided in the convex reflection portion on the object side and detects acoustic waves obtained by irradiating the sample with light.

In addition, in the objective optical system according to one aspect of the present invention, the objective optical system further includes: an optical fiber-type detector which is provided in the vicinity of the liquid contact surface and detects acoustic waves obtained by irradiating the sample with light.

A microscope system according to one aspect of the present invention includes: a microscope (40, 70) which has one of the above-described objective optical systems and an image forming lens (41, 71) combined with the objective optical system; and a correction lens (32) system which corrects an aberration caused by a combination of the objective optical system and the image forming lens.

Advantageous Effects of Invention

According to the present invention, there is an effect that observation can be performed across a wide wavelength bandwidth at a high resolution without causing any chromatic aberration.

DESCRIPTION OF EMBODIMENTS

Hereinafter, with reference to the drawings, objective optical systems and microscope systems according to embodiments of the present invention will be described in detail. In the following drawings referred to, in order to facilitate understanding, each member is illustrated with suitably changed dimensions as necessary. In addition, hereinafter, positional relationships between members will be described with reference to an XYZ orthogonal coordinate system set in the diagrams as necessary. In this XYZ orthogonal coordinate system, an X axis and a Y axis are set within a horizontal plane, and a Z axis is set in a vertical direction. However, for the sake of convenience of description, the origin of the XYZ orthogonal coordinate system indicated in each diagram is not fixed, and the position thereof is suitably changed in each diagram.

First Embodiment

<Imaging Device>

Figure 1:
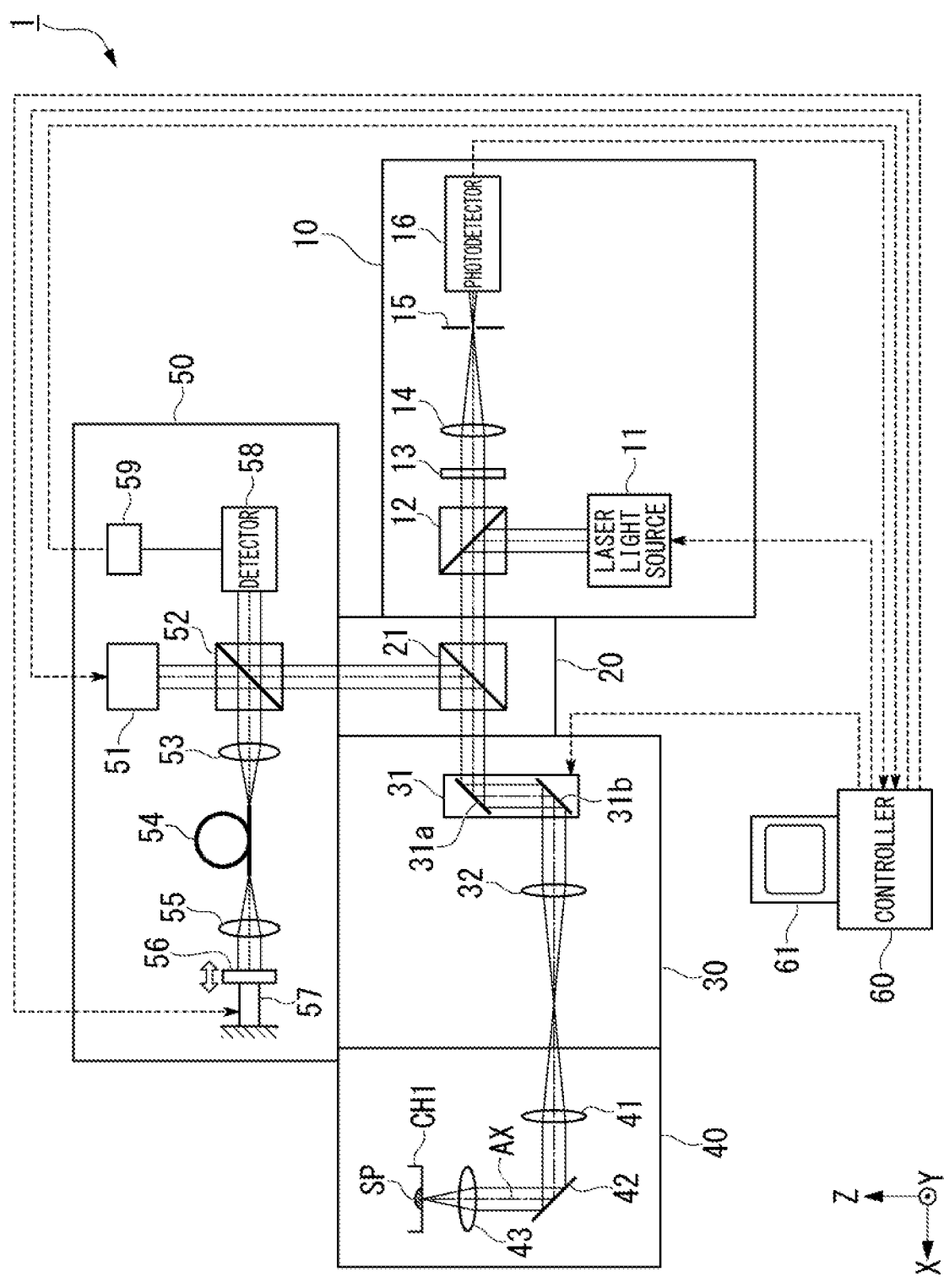
FIG. 1 is a view illustrating a configuration of a main part of an imaging device including an objective optical system according to a first embodiment of the present invention.

FIG. 1 is a view illustrating a configuration of a main part of an imaging device including an objective optical system according to a first embodiment of the present invention. As illustrated in FIG. 1, an imaging device 1 includes a confocal unit 10, a branch unit 20, an optical scanning unit 30, an inverted microscope 40, an OCT unit 50, and a controller 60. The imaging device 1 generates an image of a sample SP based on interference light resulting from interference between fluorescence obtained by irradiating the sample SP (refer to FIG. 2) stored in a sample container CH1 with laser light in a state in which the sample SP is immersed in a culture solution CF or backscattering light obtained by irradiating the sample SP with near infrared light and reference light. Hereinafter, an image based on fluorescence obtained from the sample SP will be referred to as "a fluorescence image", and an image based on the foregoing interference light will be referred to as "an OCT image".

The confocal unit 10 is a unit forming a main portion of a confocal microscope. The confocal unit 10 includes a laser light source 11, a dichroic mirror 12, a fluorescence filter 13, a lens 14, a pinhole 15, and a photodetector 16. Under control of the controller 60, the laser light source 11 emits laser light for irradiating the sample SP stored in the sample container CH1. The wavelength of laser light emitted from the laser light source 11 can be an arbitrary wavelength in accordance with the sample SP. For example, a wavelength having a wavelength bandwidth within a range of approximately 400 to 700 [nm] can be adopted. In addition, the laser light source 11 may be able to change the wavelength continuously or discretely.

The dichroic mirror 12 is a mirror having characteristics in which light having a wavelength of laser light emitted from the laser light source 11 is reflected and light having a wavelength of fluorescence obtained from the sample SP is transmitted therethrough. This dichroic mirror 12 is disposed on a positive Z side of the laser light source 11, reflects laser light which is emitted in a positive Z direction from the laser light source 11 in a positive X direction, and allows fluorescence which is emitted from the branch unit 20 and travels in a negative X direction to be transmitted therethrough.

The fluorescence filter 13 is disposed on a negative X side of the dichroic mirror 12 and allows fluorescence obtained from the sample SP to be selectively transmitted therethrough. The lens 14 collects fluorescence transmitted through the fluorescence filter 13. The pinhole 15 is disposed at a focal position of the lens 14 (a focal position on the negative X side). The photodetector 16 is disposed on the negative X side of the pinhole 15 and detects light which has passed through the pinhole 15. A detection signal of the photodetector 16 is output to the controller 60.

The branch unit 20 includes a dichroic mirror 21, is connected to the confocal unit 10, the optical scanning unit 30, and the OCT unit 50, and performs branching or the like of light between these units. The dichroic mirror 21 is disposed on a positive X side of the dichroic mirror 12 included in the confocal unit 10 and on a negative Z side of a beam splitter 52 included in the OCT unit 50. This dichroic mirror 21 is a mirror having characteristics in which light having a wavelength of laser light emitted from the confocal unit 10 and light having a wavelength of fluorescence obtained from the sample SP are transmitted therethrough and near infrared light emitted from the OCT unit 50 and backscattering light obtained from the sample SP are reflected.

In the present embodiment, an example in which the branch unit 20 performs branching or the like of light utilizing optical characteristics (properties in which reflection characteristics and transmission characteristics vary in accordance with the wavelength) of the dichroic mirror 21 will be described. However, branching or the like of light may be performed using a different configuration. For example, under control of the controller 60, branching or the like of light may be performed by disposing a reflection mirror (not illustrated) at a position of the dichroic mirror 21 or causing a reflection mirror disposed at the position thereof to retreat.

The optical scanning unit 30 includes an optical scanner 31 and a pupil projection lens 32. The optical scanning unit 30 is a unit performing scanning under control of the controller 60 within a plane orthogonal to an optical axis AX thereof with laser light or near infrared light for irradiating the sample SP. The optical scanner 31 includes a deformable mirror 31a reflecting laser light or near infrared light in a negative Z direction. Here, the laser light is transmitted through the branch unit 20 and travels in the positive X direction, and the near infrared light is reflected by the branch unit 20 and travels in the positive X direction. The optical scanner 31 also includes a deformable mirror 31b reflecting laser light or near infrared light reflected in the negative Z direction by the deformable mirror 31a in the positive X direction. These deformable mirrors 31a and 31b are configured to be able to turn around axes orthogonal to each other. For example, the deformable mirror 31a is configured to be able to turn around an axis parallel to the Y axis, and the deformable mirror 31b is configured to be able to turn around an axis included within a ZX plane along a reflection surface of the deformable mirror 31b. Turning of these deformable mirrors 31a and 31b is controlled by the controller 60.

The pupil projection lens 32 is disposed on the positive X side of the deformable mirror 31b provided in the optical scanner 31, collects laser light or near infrared light reflected in the positive X direction by the deformable mirror 31b, and converts fluorescence or backscattering light emitted in the negative X direction from the inverted microscope 40 into parallel light. In the example illustrated in FIG. 1, laser light or near infrared light is collected inside the optical scanning unit 30 by the pupil projection lens 32, and diffusional laser light or near infrared light is emitted from the optical scanning unit 30. Laser light or near infrared light (diffusional laser light or near infrared light) emitted from the confocal unit 10 is incident on the inverted microscope 40.

The inverted microscope 40 includes an image forming lens 41, a mirror 42, and an objective optical system 43. The inverted microscope 40 is used for observing the sample SP stored in the sample container CH1 from a side underneath (negative Z side). As described below, the objective optical system 43 is an optical system including no lens but performs an action (light collecting action) similar to that of a lens. For this reason, in FIG. 1, the objective optical system 43 is illustrated in a shape of a lens for convenience.

The image forming lens 41 is a lens converting laser light or near infrared light which is emitted from the optical scanning unit 30 and is incident on the inverted microscope 40 into parallel light and forming an image of fluorescence or backscattering light which is reflected by the mirror 42 and travels in the negative X direction. The mirror 42 is disposed in the positive X direction of the image forming lens 41, reflects laser light or near infrared light traveling in the positive X direction via the image forming lens 41 in the positive Z direction, and reflects fluorescence or backscattering light traveling in the negative Z direction via the objective optical system 43 in the negative X direction.

The objective optical system 43 is disposed on the positive Z side of the mirror 42, collects laser light or near infrared light reflected in the positive Z direction by the mirror 42 such that the sample SP is irradiated therewith, and converts fluorescence or backscattering light obtained from the sample SP into parallel light. This objective optical system 43 can also be configured to be able to move in the Z direction under control of the controller 60. The objective optical system 43 will be described below in detail.

The OCT unit 50 includes a broadband light source 51, the beam splitter 52, a lens 53, an optical fiber 54, a lens 55, a mirror 56, a modulator 57, a detector 58, and a band-pass filter 59. Under control of the controller 60, the broadband light source 51 emits light having a wide wavelength bandwidth for irradiating the sample SP stored in the sample container CH1. The wavelength bandwidth of light emitted from the broadband light source 51 can be an arbitrary wavelength bandwidth in accordance with the sample SP. For example, a wavelength bandwidth of near infrared within a range of approximately 800 to 1,500 [nm] can be adopted. In the present embodiment, the broadband light source 51 emits near infrared light.

The beam splitter 52 is disposed on the negative Z side of the broadband light source 51 and causes near infrared light emitted from the broadband light source 51 in the negative Z direction to branch into near infrared light toward the dichroic mirror 21 provided in the branch unit 20 (near infrared light traveling in the negative Z direction) and near infrared light toward lens 53 (near infrared light traveling in the positive X direction). In addition, the beam splitter 52 multiplexes return light of each ray of the branched near infrared light (backscattering light obtained from the sample SP and near infrared light (reference light) subjected to frequency modulation by modulator 57).

The lens 53 is disposed on the positive X side of the beam splitter 52, collects near infrared light which has branched through the beam splitter 52 and travels in the positive X direction such that the near infrared light is incident on a first end of the optical fiber 54, and converts near infrared light emitted from the first end of the optical fiber 54 into parallel light. The optical fiber 54 is an optical waveguide guiding near infrared light incident from the first end to a second end and guiding near infrared light incident from the second end to the first end. The lens 55 is disposed on the positive X side of the optical fiber 54, converts near infrared light emitted from the second end of the optical fiber 54 into parallel light, and collects near infrared light which is reflected by the mirror 56 and travels in the negative X direction such that the near infrared light is incident on the second end of the optical fiber 54.

The mirror 56 is attached to the modulator 57 on the positive X side of the lens 55 in a state in which the reflection surface is directed toward the lens 55. The modulator 57 is driven by the controller 60 and causes the mirror 56 in a state of having the reflection surface toward the lens 55 to minutely vibrate in the X direction. For example, this modulator 57 may be a piezoelectric element in which a strain is generated in case that a voltage is applied. The mirror 56 and the modulator 57 are provided to obtain reference light by performing frequency modulation of near infrared light which is reflected in the negative X direction by the mirror 56 at a uniform frequency. The optical path length from the beam splitter 52 to the mirror 56 via the optical fiber 54 and the optical path length from the beam splitter 52 to the sample SP (focal position P) are configured to be equivalent to each other.

The detector 58 is disposed on the negative X side of the beam splitter 52 and detects interference light of backscattering light and reference light multiplexed by the beam splitter 52. The band-pass filter 59 is a filter for extracting a signal component, of detection signals output from the detector 58, subjected to frequency modulation by the modulator 57. A signal component extracted by this band-pass filter 59 is output to the controller 60 as a detection signal.

The controller 60 integrally controls operation of the imaging device 1. For example, the controller 60 controls the laser light source 11 provided in the confocal unit 10 such that laser light for irradiating the sample SP is emitted or stopped and controls the broadband light source 51 provided in the OCT unit 50 such that near infrared light for irradiating the sample SP is emitted or stopped. In addition, the controller 60 drives the modulator 57 provided in the OCT unit 50.

In addition, the controller 60 controls the optical scanner 31 provided in the optical scanning unit 30 such that scanning of the sample SP with laser light or near infrared light is performed (scanning along the X axis and the Y axis). In addition, for example, the controller 60 controls an electromotive stage (not illustrated) or the like for mounting the sample container CH1 such that scanning of the sample SP (scanning along the Z axis) with laser light or near infrared light is performed. In addition, the controller 60 generates a fluorescence image by performing signal processing of a detection signal output from the photodetector 16 provided in the confocal unit 10 and causes a display monitor 61 to display the generated fluorescence image. The controller 60 generates an OCT image by performing signal processing of a detection signal output from the OCT unit 50 and causes the display monitor 61 to display the generated OCT image. For example, the display monitor 61 is a monitor including a liquid crystal display device or the like.

<Objective Optical System>

Figure 2:
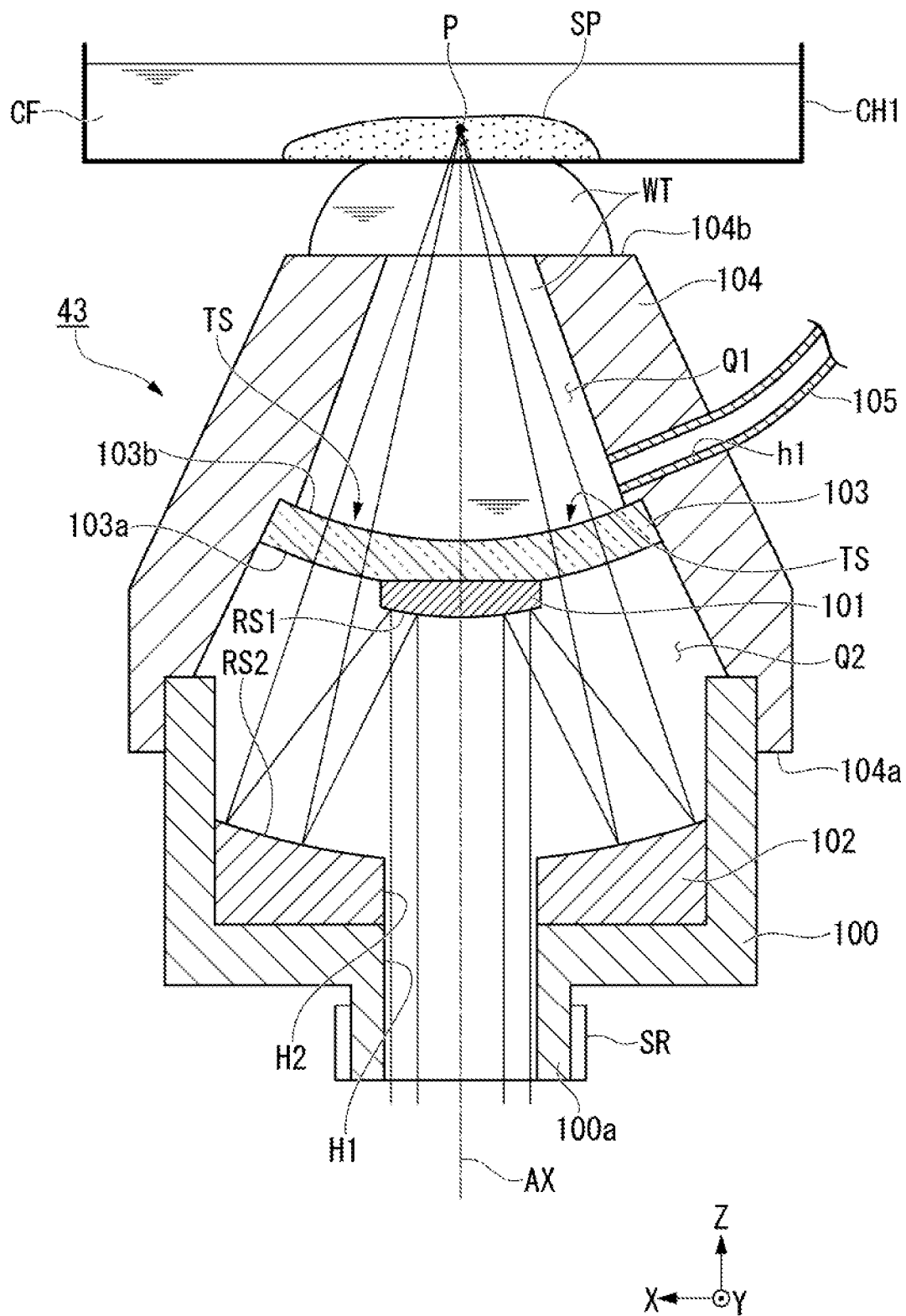
FIG. 2 is a cross-sectional view illustrating a configuration of a main part of the objective optical system according to the first embodiment of the present invention.

FIG. 2 is a cross-sectional view illustrating a configuration of a main part of the objective optical system according to the first embodiment of the present invention. As illustrated in FIG. 2, the objective optical system 43 of the present embodiment includes a lens barrel 100, a convex mirror 101, a concave mirror 102, a cover member 103, a water receiving member 104 (liquid holding member), and a supply tube 105 (liquid supply portion).

The lens barrel 100 is a substantially toric member having a bottom and internally holds the concave mirror 102.

A hole portion H1 through which laser light or near infrared light traveling toward the sample SP (laser light or near infrared light reflected in the positive Z direction by the mirror 42) passes is formed in a central portion on a bottom surface of the lens barrel 100. In addition, a protruding portion 100a, which has the same inner diameter as the hole portion H1, in which a screw portion SR is formed on an outer surface, and which protrudes in the negative Z direction, is provided on the bottom surface of the lens barrel 100. Due to the screw portion SR of the protruding portion 100a screwed to a support member (not illustrated), the objective optical system 43 is fixed to the inverted microscope 40. The shape of the lens barrel 100 is not limited to a toric shape having a bottom and may be other shapes (for example, a rectangular ring shape having a bottom).

The convex mirror 101 is a mirror which is disposed on the optical axis AX of laser light or near infrared light traveling toward the sample SP and has a convex reflection surface RS1 (convex reflection portion) reflecting laser light or near infrared light traveling toward the sample SP. Specifically, as illustrated in FIG. 2, the convex mirror 101 is supported by the cover member 103 such that its middle portion is disposed on the optical axis AX on an object side (positive Z side) of the concave mirror 102. The position of the convex mirror 101 becomes a pupil position of the objective optical system 43. The convex mirror 101 is optically conjugated with the inside or a part in the vicinity of the optical scanner 31 provided in the optical scanning unit 30 by the image forming lens 41 provided in the inverted microscope 40, the pupil projection lens 32 provided in the optical scanning unit 30, or the like.

The concave mirror 102 is a mirror which has a concave reflection surface RS2 (concave reflection portion) reflecting laser light or near infrared light reflected by the convex mirror 101 toward the sample SR The reflection surface RS2 of the concave mirror 102 is designed such that laser light or near infrared light which has been reflected is collected in the sample SR. A Schwarzschild-type reflection objective mirror (reflection optical system) is formed of the convex mirror 101 and the concave mirror 102. The concave mirror 102 has an outer diameter approximately the same as the inner diameter of the lens barrel 100, and a hole portion H2 through which laser light or near infrared light traveling toward the sample SP (laser light or near infrared light reflected in the positive Z direction by the mirror 42) passes is formed in the central portion thereof. The inner diameter of the hole portion H2 formed in the concave mirror 102 is approximately the same as the inner diameter of the hole portion H1 formed in the central portion on the bottom surface of the lens barrel 100. The concave mirror 102 is held by the lens barrel 100 such that the hole portion H2 is disposed on the optical axis AX.

Figure 3:
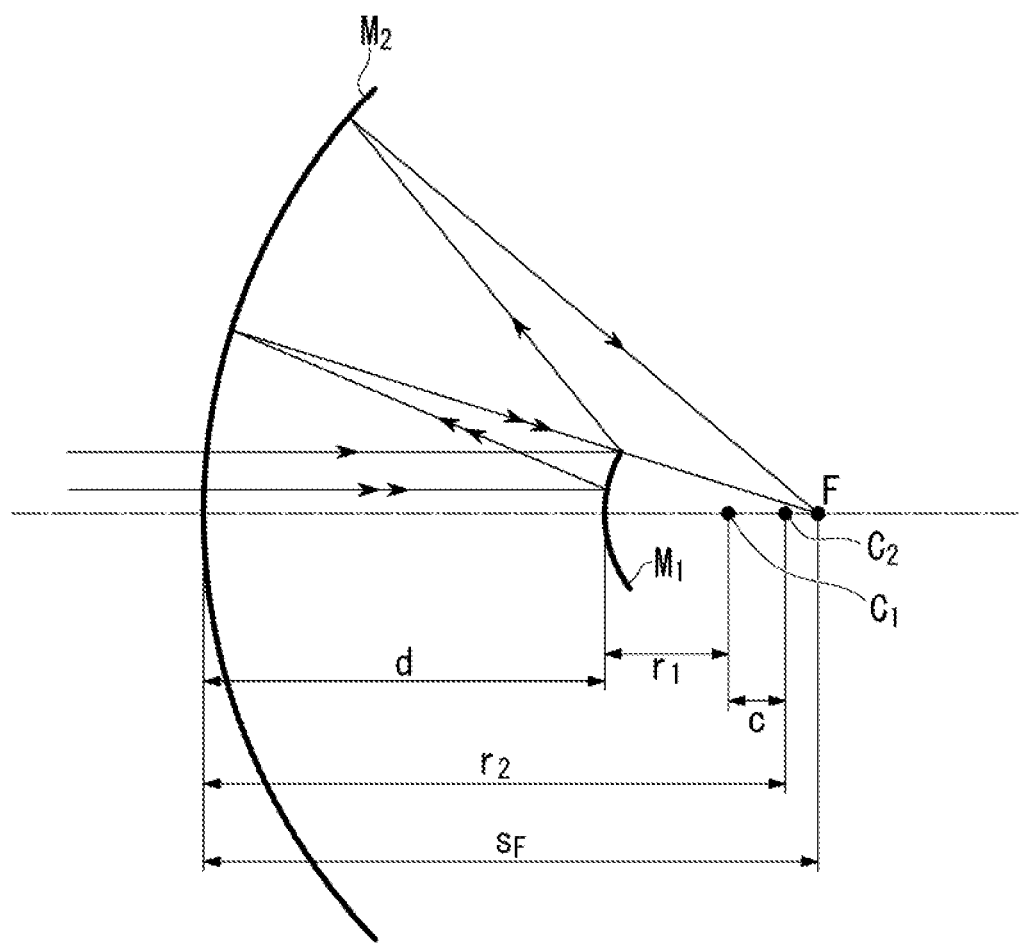
FIG. 3 is a view illustrating a Schwarzschild-type reflection objective mirror.

Here, the Schwarzschild-type reflection objective mirror formed of the convex mirror 101 and the concave mirror 102 will be examined. FIG. 3 is a view illustrating a Schwarzschild-type reflection objective mirror. As illustrated in FIG. 3, the convex mirror 101 is a small mirror $M_1$, and the concave mirror 102 is a large mirror $M_2$. The absolute value for a radius of curvature of the small mirror $M_1$ is $r_1$, and the absolute value for a radius of curvature of the large mirror $M_2$ is $r_2$. In addition, in case that a gap between a center $C_1$ of curvature of the small mirror $M_1$ and a center $C_2$ of curvature of the large mirror $M_2$ is c, a gap d between the small mirror $M_1$ and the large mirror $M_2$ is indicated by the following Expression (1).

[Math 1]

$$d = r_2 - r_1 - c \qquad (1)$$

In addition, in case that a focal distance of the small mirror $M_1$ is $f_1$ and a focal distance of the large mirror $M_2$ is $f_2$, the focal distances $f_1$ and $f_2$ are expressed by the following Expression (2).

[Math 2]

$$f_1 = -\frac{r_1}{2}, f_2 = \frac{r_2}{2} \qquad (2)$$

Here, a and b are defined as in the following Expression (3).

[Math 3]

$$\frac{r_1}{r_2} = a, \frac{c}{r_1} = b \qquad (3)$$

Consequently, the focal distance f of the Schwarzschild-type reflection objective mirror formed of the convex mirror 101 and the concave mirror 102 and a distance SF in FIG. 3 are expressed by the following Expression (4).

[Math 4]

$$f = \frac{r_1}{2} \frac{1}{\{1 - a(1 + 2b)\}} \qquad (4)$$
$$s_F = f \frac{\{2 - a(1 + 2b)\}}{a}$$

For example, the cover member 103 is a member formed of a glass, a transparent resin, or the like having a partially spherical shell shape and is attached to the water receiving member 104 such that an internal space of the water receiving member 104 is partitioned into an internal space Q1 and an internal space Q2. This cover member 103 is provided to allow the sample SP to be able to be observed through liquid immersion even with the inverted microscope 40 by holding a liquid WT such as water in the internal space Q1 of the water receiving member 104 (further, between the water receiving member 104 and the sample container CH1). The cover member 103 is firmly adhered (for example, bonded) to the water receiving member 104 such that the liquid WT held in the internal space Q1 of the water receiving member 104 does not infiltrate into the internal space Q2.

The cover member 103 is disposed on the optical path of laser light or near infrared light reflected by the concave mirror 102 and has an incidence surface 103a on which laser light or near infrared light reflected by the concave mirror 102 is incident and an emission surface 103b through which laser light or near infrared light incident from the incidence surface 103a is emitted. k case that the liquid WT is held in the internal space Q1 of the water receiving member 104, the emission surface 103b becomes a liquid contact surface which comes into contact with the liquid WT. Except for the middle portion, the incidence surface 103a is formed to be orthogonal to the optical path of laser light or near infrared light reflected by the concave mirror 102. The emission surface 103b is also formed to be orthogonal to the optical path of laser light or near infrared light reflected by the concave mirror 102. The surfaces are formed in this manner in order to prevent a chromatic aberration from occurring across a wide wavelength bandwidth by preventing refraction (or preventing refraction as much as possible) from occurring on the incidence surface 103a (an interface between air and the cover member 103) and the emission surface 103b (an interface between the cover member 103 and the liquid WT).

For example, the incidence surface 103a of the cover member 103 is formed as a spherical surface except for the middle portion, and the center of curvature thereof is set to be equivalent to the focal position P of the reflection objective mirror formed of the convex mirror 101 and the concave mirror 102. The middle portion on the incidence surface 103a is set to be flat for fixing the convex mirror 101. In addition, the emission surface 103b of the cover member 103 is formed as a spherical surface, and the center of curvature thereof is set to be equivalent to the foregoing focal position P. A part of the cover member 103 through which laser light or near infrared light is transmitted is a transmission portion TS.

The water receiving member 104 is a tubular member having a diameter decreasing from a first end portion 104a toward a second end portion 104b, and the first end portion 104a is attached to an end portion of the lens barrel 100 on the object side. This water receiving member 104 supports the cover member 103 such that the internal space is partitioned into the internal space Q1 and the internal space Q2 by the cover member 103. The water receiving member 104 can hold the liquid WT in the internal space Q1 partitioned by the cover member 103. In addition, since the water receiving member 104 has a diameter decreasing from the first end portion 104a toward the second end portion 104b, even the small sample container CH1 can hold the liquid WT between the sample container CH1 and the water receiving member 104. The hole portion h1 communicating with the internal space Q1 of the water receiving member 104 and the outside of the water receiving member 104 is formed on a side surface of this water receiving member 104.

The supply tube 105 is a tube for supplying the liquid WT to the internal space Q1 of the water receiving member 104. For example, the supply tube 105 is formed of a rubber or a resin, in which the first end portion is inserted into the hole portion h1 formed on the side surface of the water receiving member 104 and the second end portion is connected to a liquid supply device (not illustrated). The liquid WT is supplied from the liquid supply device to the internal space Q1 of the water receiving member 104 via the supply tube 105.

<Operation of Imaging Device>

(1) Operation During Generation of Fluorescence Image

In case that operation of the imaging device 1 starts, first, the laser light source 11 of the confocal unit 10 is controlled by the controller 60, and laser light is emitted from the laser light source 11 in the positive Z direction. Laser light emitted from the laser light source 11 is reflected in the positive X direction by the dichroic mirror 12, is transmitted through the dichroic mirror 21 of the branch unit 20 thereafter, and is incident on the inverted microscope 40 via the optical scanner 31 and the pupil projection lens 32 provided in the optical scanning unit 30 in order. Laser light incident on the inverted microscope 40 goes through the image forming lens 41, is reflected in the positive Z direction by the mirror 42 thereafter, and is incident on the objective optical system 43.

Laser light incident on the objective optical system 43 passes through the hole portion H1 formed in the lens barrel 100 and the hole portion H2 formed in the concave mirror 102, is incident on and reflected by the convex mirror 101 thereafter, and is incident on and reflected by the concave mirror 102. As illustrated in FIG. 2, laser light reflected by the concave mirror 102 is incident on the incidence surface 103a of the cover member 103, is transmitted through the cover member 103, and is emitted through the emission surface 103b thereafter. The laser light goes through the liquid WT (including the liquid WT held between the water receiving member 104 and the sample container CH1) held in the internal space Q1 of the water receiving member 104, and the inside of the sample SP is irradiated with the laser light thereafter.

Here, except for the middle portion, the incidence surface 103a of the cover member 103 is formed to be orthogonal to the optical path of laser light reflected by the concave mirror 102. For this reason, laser light reflected by the concave mirror 102 is incident in a manner of being perpendicular to a surrounding portion (a part excluding the middle portion) on the incidence surface 103a of the cover member 103. In addition, the emission surface 103b of the cover member 103 is also formed to be orthogonal to the optical path of laser light reflected by the concave mirror 102. For this reason, laser light transmitted through the cover member 103 is emitted in a direction perpendicular to the emission surface 103b.

For this reason, laser light reflected by the concave mirror 102 travels straight ahead without being refracted by the cover member 103.

In addition, due to the liquid WT held in the internal space Q1 of the water receiving member 104 and the liquid WT held between the water receiving member 104 and the sample container CH1, the optical path of laser light transmitted through the cover member 103 has a refractive index close to the refractive indices of the sample SP and the sample container CH1. For this reason, reflection of laser light transmitted through the cover member 103 (reflection by a bottom portion of the sample container CH1 and a front surface of the sample SP) is extremely reduced, and much laser light is incident inside the sample SP. In addition, refraction of laser light transmitted through the cover member 103 (refraction on the bottom portion of the sample container CH1 and the front surface of the sample SP) is extremely reduced as well, and a great part of laser light transmitted through the cover member 103 travels straight ahead and is collected at the focal position P. In this manner, since refraction of laser light seldom occurs in the objective optical system 43 of the present embodiment, laser light can be focused on the original focal position P of the Schwarzschild-type reflection objective mirror formed of the convex mirror 101 and the concave mirror 102.

In addition, in case that a space between the cover member 103 and a bottom surface of the sample container CH1 is filled with the liquid WT, the refractive indices of the sample container CH1 and the liquid WT are close to each other. Therefore, reflection of laser light is reduced compared to in case that the space is not filled with the liquid WT (in case that it is air). However, depending on the sample container CH1 to be used, it is assumed to be difficult to make the refractive indices of the liquid WT and the sample container CH1 close to each other to such an extent that refraction occurring therebetween can be disregarded. Here, since fluctuation in optical path caused by refraction decreases as the plate thickness of the bottom portion of the sample container CH1 becomes thinner, it is preferable to use such a sample container CH1 including a bottom portion having a thin plate thickness. In addition, it is also preferable that an optical system for correcting fluctuation in optical path occurring on the lower surface and an upper surface of the bottom portion of the sample container CH1 be built into the objective optical system 43. For example, since a glass having a thickness of 0.17 mm is often used as the bottom surface of the sample container CH1, the concave mirror 102 configured to correct fluctuation in optical path in case that light passes through this glass may be used.

In case that the sample SP is irradiated with laser light, fluorescence is radiated from a fluorescent substance included in the sample SP. Fluorescence radiated from the sample SP travels along the optical path of laser light in the opposite direction. As illustrated in FIG. 2, since the convex mirror 101 is disposed on the optical axis AX, a cross-sectional shape (a shape of a surface perpendicular to the optical axis AX) of fluorescence emitted from the objective optical system 43 becomes a ring shape. Fluorescence emitted from the objective optical system 43 is transmitted through the dichroic mirror 21 of the branch unit 20 via the mirror 42, the image forming lens 41, the pupil projection lens 32, and the optical scanner 31 in order and is introduced to the dichroic mirror 12 of the confocal unit 10. Fluorescence introduced to the dichroic mirror 12 is transmitted through the dichroic mirror 12 and is incident on the fluorescence filter 13 thereafter.

Further, only a particular wavelength component of wavelength components included in fluorescence is transmitted through the fluorescence filter 13. A wavelength component transmitted through the fluorescence filter 13 is incident on the pinhole 15 via the lens 14, and only light from a focal surface is transmitted through the pinhole 15, is incident on the photodetector 16, and is detected.

A detection signal of the photodetector 16 is output to the controller 60, is converted into a digital signal, and is associated with a scanning position (a scanning position for the optical scanner 31 within an XY plane and a scanning position in the Z direction for the electromotive stage (not illustrated) or the like for mounting the sample container CH1). The foregoing operation is performed while the scanning position for the optical scanner 31 within the XY plane is changed (further, while the scanning position in the Z direction for the electromotive stage (not illustrated) or the like for mounting the sample container CH1 is changed).

Here, as described above, the pupil position of the objective optical system 43 (position of the convex mirror 101) is optically conjugated with the inside or a part in the vicinity of the optical scanner 31 provided in the optical scanning unit 30. Therefore, even in case that scanning is performed by the optical scanner 31 with laser light used for irradiating the sample SP, almost all the laser light passes through the pupil position of the objective optical system 43. That is, a state equivalent to scanning performed with laser light at the pupil position of the objective optical system 43 is realized.

Accordingly, a loss of laser light can be reduced. In case that such operation is performed, a two-dimensional or three-dimensional fluorescence image is generated. A generated fluorescence image may be displayed by the display monitor 61 or may be stored in a memory (not illustrated) inside thereof.

(2) Operation During Generation of OCT Image

In case that operation of the imaging device 1 starts, first, the broadband light source 51 of the OCT unit 50 is controlled by the controller 60, such that near infrared light is emitted from the broadband light source 51 in the negative Z direction. Near infrared light emitted from the broadband light source 51 is incident on the beam splitter 52 and branches into near infrared light toward the dichroic mirror 21 provided in the branch unit 20 (near infrared light traveling in the negative Z direction) and near infrared light toward lens 53 (near infrared light traveling in the positive X direction).

The former branched light (near infrared light traveling in the negative Z direction) is reflected in the positive X direction by the dichroic mirror 21 and is incident on the optical scanner 31 provided in the optical scanning unit 30. The sample SP is irradiated with near infrared light incident on the optical scanner 31 via an optical path similar to the optical path of laser light described in the section of operation during generation of a fluorescence image. Here, in the objective optical system 43, even in case that the sample SP is irradiated with near infrared light, refraction seldom occurs similar to in case that the sample SP is irradiated with laser light. Therefore, near infrared light can be focused on the original focal position P of the Schwarzschild-type reflection objective mirror formed of the convex mirror 101 and the concave mirror 102. In case that the sample SP is irradiated with near infrared light, backscattering light is radiated from the sample SP. Backscattering light radiated from the sample SP is incident on the dichroic mirror 21 provided in the branch unit 20 via an optical path similar to the optical path of fluorescence described in the section of operation during generation of a fluorescence image, is reflected in the positive Z direction, and is incident on the beam splitter 52 of the OCT unit 50 thereafter.

The latter branched light (near infrared light traveling in the positive X direction) is collected by the lens 53, is incident inside the optical fiber 54 from the first end of the optical fiber 54, is propagated in the optical fiber 54, and is emitted from the second end of the optical fiber 54 thereafter. Near infrared light emitted from the second end of the optical fiber 54 is converted into parallel light by the lens 55 and is incident on and reflected by the mirror 56 minutely vibrated in the X direction by the modulator 57. Accordingly, near infrared light reflected by the mirror 56 becomes reference light subjected to frequency modulation at a uniform frequency. This reference light is collected by the lens 55, is incident inside the optical fiber 54 from the second end of the optical fiber 54, is propagated in the optical fiber 54, and is emitted from the first end of the optical fiber 54 thereafter. Near infrared light emitted from the first end of the optical fiber 54 is converted into parallel light by the lens 53 and is incident on the beam splitter 52 thereafter.

Backscattering light and reference light incident on the beam splitter 52 are multiplexed by the beam splitter 52 and are incident on the detector 58, and a detection signal of interference light of backscattering light and reference light is output from the detector 58. A detection signal output from the detector 58 is input to the band-pass filter 59, a signal component subjected to frequency modulation by the modulator 57 is extracted, and this signal component is output to the controller 60 as a detection signal.

Here, the optical path length from the beam splitter 52 to the mirror 56 via the optical fiber 54 and the optical path length from the beam splitter 52 to the sample SP (focal position P) are configured to be equivalent to each other. In case that the optical path lengths thereof coincide with each other, interference between backscattering light and reference light becomes the maximum, and in case that there is a difference of approximately 10 [μun] between the optical path lengths, interference between backscattering light and reference light seldom occurs. For this reason, backscattering light generated at the focal position P can be detected sensitively by extracting a signal component subjected to frequency modulation by the modulator 57 from detection signals output from the detector 58.

A detection signal output from the band-pass filter 59 to the controller 60 is converted into a digital signal and is associated with the scanning position (the scanning position for the optical scanner 31 within the XY plane and the scanning position in the Z direction for the electromotive stage (not illustrated) or the like for mounting the sample container CH1). The foregoing operation is performed while the scanning position for the optical scanner 31 within the XY plane is changed (further, while the scanning position in the Z direction for the electromotive stage (not illustrated) or the like for mounting the sample container CH1 is changed).

In case that such operation is performed, a two-dimensional or three-dimensional OCT image is generated. A generated OCT image may be displayed by the display monitor 61 or may be stored in a memory (not illustrated) inside thereof.

As described above, in the present embodiment, the objective optical system 43 is configured such that the cover member 103 having the incidence surface 103a and the emission surface 103b (liquid contact surface) formed to be orthogonal to the optical path of light reflected by the concave mirror 102 is attached to the water receiving member 104 and the liquid WT can be held in the internal space Q1 of the water receiving member 104. For this reason, in both cases such as a case in which the sample SP is irradiated with laser light and a case in which the sample SP is irradiated with near infrared light, refraction seldom occurs in the objective optical system 43. Therefore, a chromatic aberration seldom occurs. For this reason, it is possible to cope with light within an extensive wavelength range of UV light to near infrared light using one objective optical system 43. Accordingly, images at the same observation places obtained by simultaneously performing observation using light having various wavelengths can be superimposed. In addition, not only a chromatic aberration but also various aberrations caused by tropism can be reduced. Moreover, in the present embodiment, since the sample SP is observed through liquid immersion, the resolution can be enhanced compared to in case that the sample SP is observed without depending on liquid immersion.

In the embodiment described above, in order to facilitate understanding, operation during generation of a fluorescence image and operation during generation of an OCT image have been described separately. However, a fluorescence image and an OCT image may be generated simultaneously by irradiating the sample SP with laser light emitted from the laser light source 11 of the confocal unit 10 and irradiating the sample SP with near infrared light emitted from the broadband light source 51 of the OCT unit 50.

[First Modification Example of First Embodiment]

Figure 4:
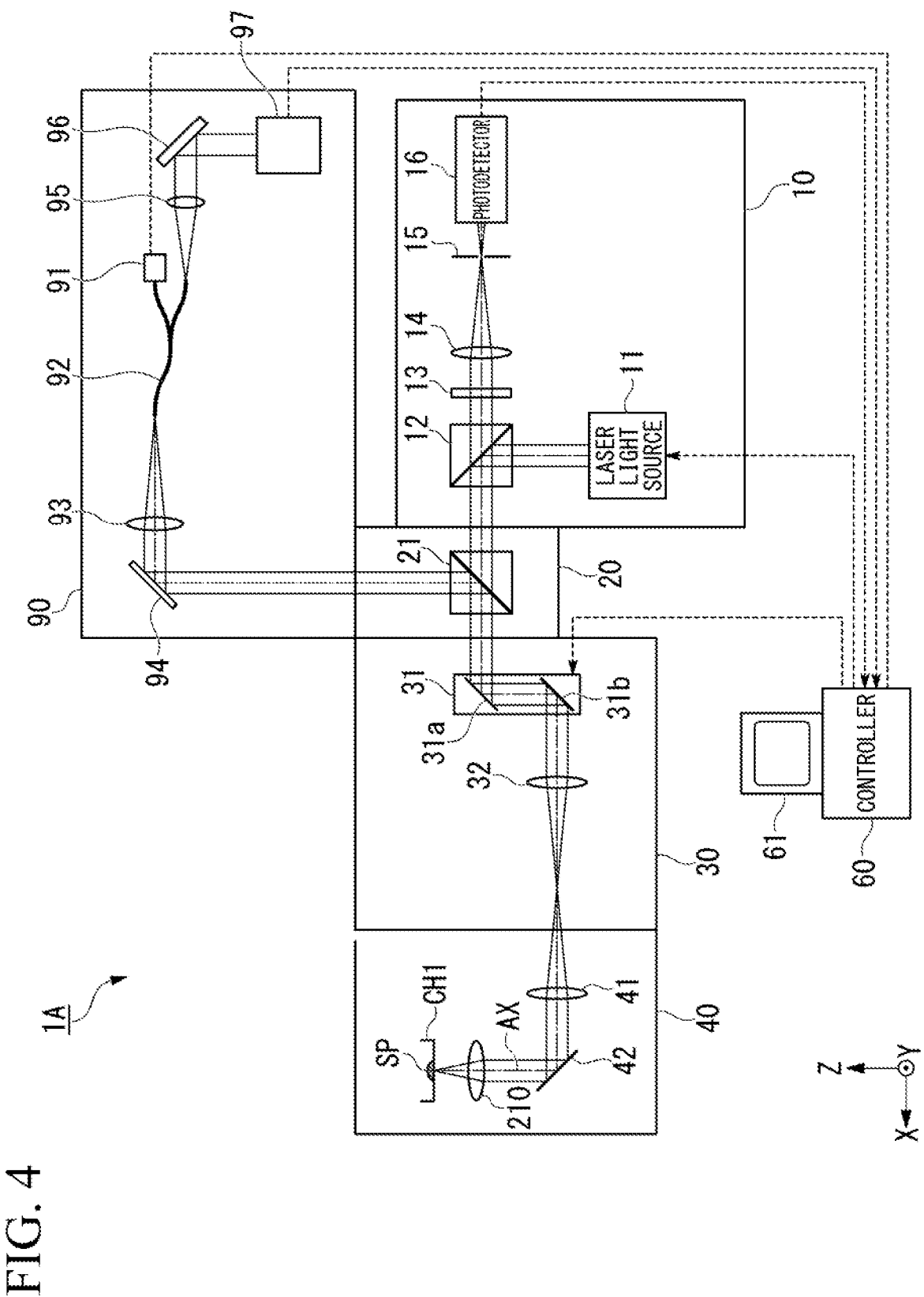
FIG. 4 is a view illustrating a configuration of a main part of an imaging device including an objective optical system according to a first modification example of the first embodiment of the present invention.

FIG. 4 is a view illustrating a configuration of a main part of an imaging device 1A including an objective optical system 210 according to a first modification example of the first embodiment of the present invention. In the first embodiment, although the OCT unit 50 in the embodiment described above is a time-domain type, the imaging device 1A of the first modification example of the first embodiment includes an OCT unit 90 for spectral-domain optical coherence tomography (SD-OCT) of a wavelength domain, in place of the OCT unit 50. In addition, the imaging device 1A of the first modification example of the first embodiment includes the objective optical system 210, in place of the objective optical system 43.

For example, the OCT unit 90 includes an SLD 91, an optical circulator 92, a collimator lens 93, a deflection mirror 94, a collimator lens 95, a diffraction grating 96, and a camera 97. The SLD 91 is a super luminescent diode having a wide spectrum of output light and emitting light having high luminance with a short coherence length. Light emitted by the SLD 91 enters a first end of the optical circulator 92, comes out from a second end of the optical circulator, and enters the collimator lens 93. Light which has entered the collimator lens 93 is reflected by a turn-back mirror 94 and enters the branch unit 20. Similar to the first embodiment, light incident on the branch unit 20 is reflected by the dichroic mirror 21, and the sample SP is irradiated by the inverted microscope 40 via the optical scanning unit 30.

Figure 5:
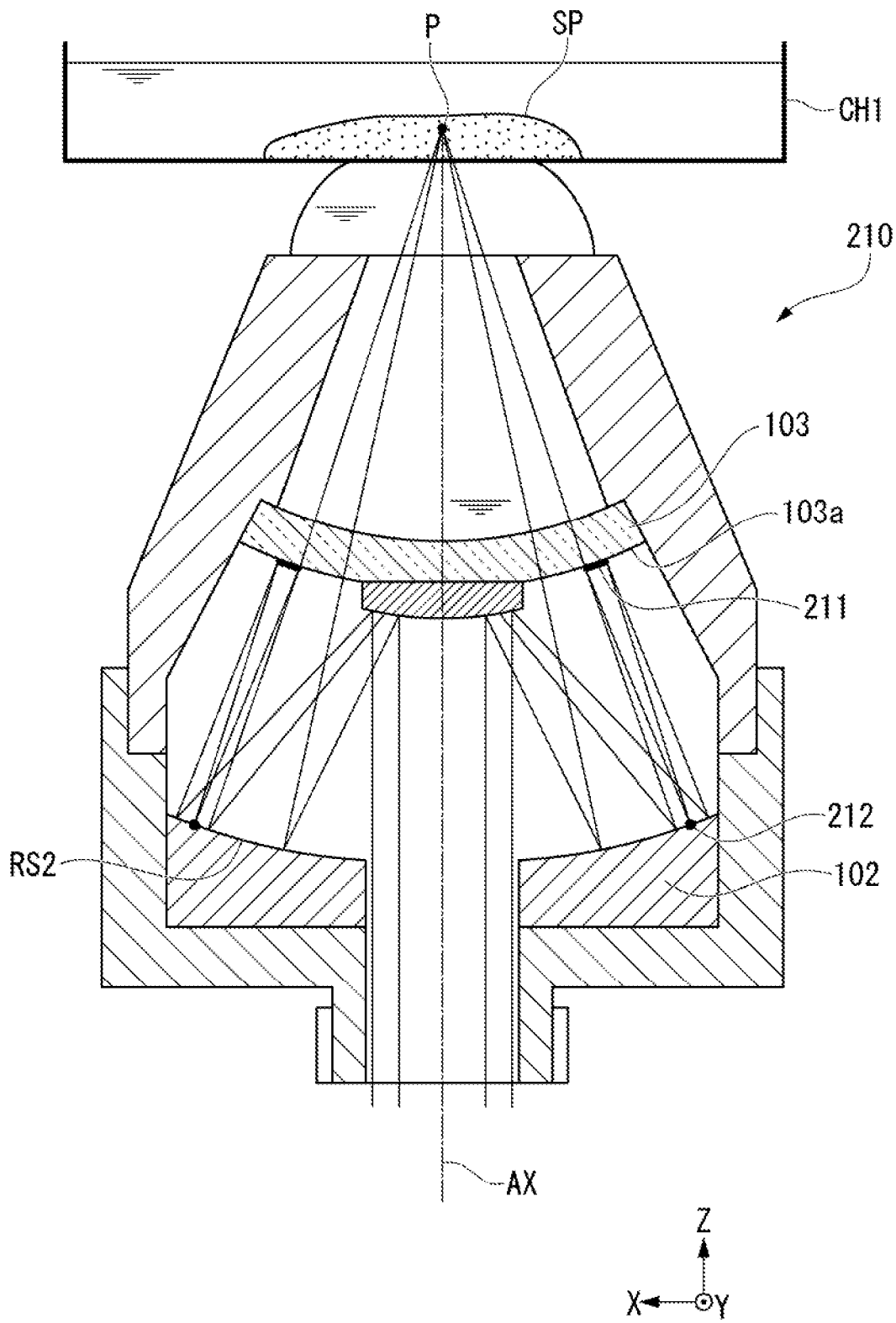
FIG. 5 is a cross-sectional view illustrating a configuration of a main part of the objective optical system according to the first modification example of the first embodiment of the present invention.

FIG. 5 is a cross-sectional view illustrating a configuration of the main part of the objective optical system 210 according to the first modification example of the first embodiment. The objective optical system 210 of the first modification example of the first embodiment has the same basic configuration as the objective optical system 43 of the first embodiment, but the objective optical system 210 of the first modification example of the first embodiment differs from the objective optical system 43 of the first embodiment in that the incidence surface 103a of the cover member 103 includes a plurality of reflection surfaces 211. The reflection surfaces 211 are provided at a plurality of places near an outer circumference on the incidence surface 103a through which light passes. It is preferable that the reflection surfaces 211 be provided at approximately four, six, or eight positions symmetrical to the optical axis AX. The reflection surfaces 211 are an example of a reference light reflection portion. Front surfaces of the reflection surfaces 211 are formed to have a concave shape such that rays of light reflected by the reflection surfaces 211 are concentrated on a focus 212 on the reflection surface RS2 of the concave mirror 102. The curvatures on the reflection surfaces 211 are suitably designed to provide a slight difference between the optical path length of light incident on the objective optical system 210 to the focal position P and the optical path length to the focus 212 on which rays of light reflected by the reflection surface 211 are concentrated. It is preferable that this difference between the optical path lengths be 100 µm or shorter. In addition, the objective optical system 210 is configured to retain a uniform difference between the optical path lengths by moving the focus 212 on the reflection surface RS2 even in case that the optical scanner 31 performs scanning with light for irradiating the sample SP within a plane orthogonal to the optical axis AX and light incident on the objective optical system 210 tilts.

Light which is incident on the objective optical system 210 and is reflected at the focal position P and light which is incident on the objective optical system 210 and is reflected by the focus 212 return through the same optical path in the inverted microscope 40 and the optical scanning unit 30, are reflected by the dichroic mirror 21 of the branch unit 20, pass through the deflection mirror 94 and the collimator lens 93 of the OCT unit 90, and are introduced to the optical circulator 92. Return light which has entered the second end of the optical circulator 92 comes out from a third end of the optical circulator 92, is collimated by the collimator lens 95, and is incident on the diffraction grating 96. SLD light having a width of the wavelength is split by the diffraction grating 96. In case that there is light reflected at the focal position P, light reflected at the focal position P and reference light reflected by the focus 212 interfere with each other due to the difference between the optical path length of light reflected at the focal position P and the optical path length of reference light reflected by the focus 212 so that building wavelengths and attenuating wavelengths are generated due to the interference. The intensity of scattering light from the focal position P can be calculated and imaged by capturing an image of a stripe pattern caused by this interference using the camera 97 and analyzing the captured image.

The imaging device 1A of the first modification example of the first embodiment is characterized by having less noise than the imaging device 1 of the first embodiment. In addition, in the imaging device 1A of the first modification example of the first embodiment, since the reflection surfaces 211 (reference optical system) for reflecting reference light causing interference are provided inside the objective optical system 210, there is no need to adjust the optical path length of the reference optical system. Therefore, the imaging device 1A can be simply realized.

[Second Modification Example of First Embodiment]

Figure 6:
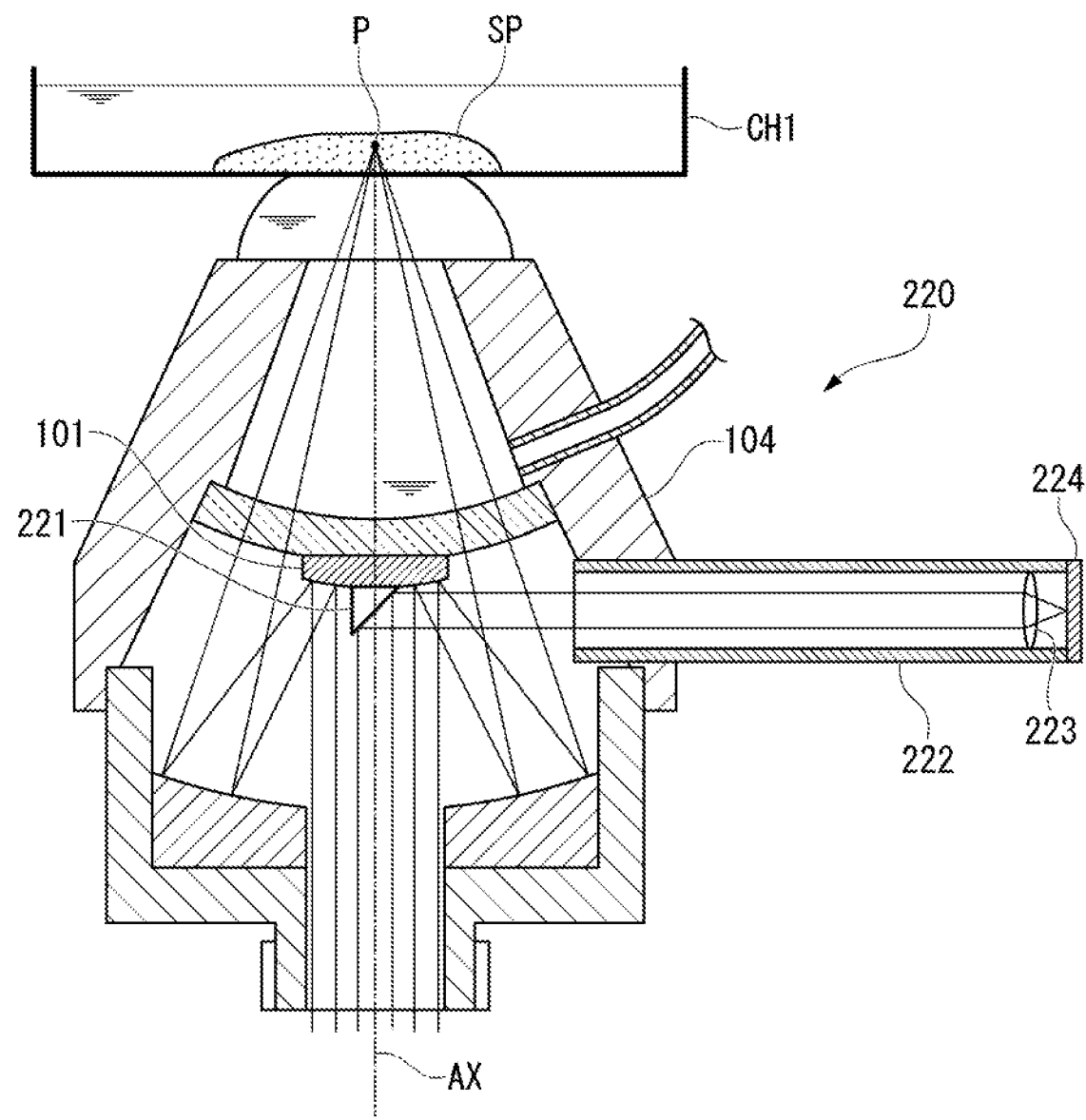
FIG. 6 is a cross-sectional view illustrating a configuration of a main part of an objective optical system according to a second modification example of the first embodiment of the present invention.

FIG. 6 is a cross-sectional view illustrating a configuration of a main part of an objective optical system 220 according to a second modification example of the first embodiment of the present invention. The objective optical system 220 of the second modification example of the first embodiment has the same basic configuration as the objective optical system 43 of the first embodiment, but the objective optical system 220 of the second modification example of the first embodiment differs from the objective optical system 43 of the first embodiment in that a prism 221 having a reflection surface set at 45 degrees is fixed to a part in the vicinity of the center of the convex mirror 101 and a reference light lens barrel 222 is fixed to the water receiving member 104. A reference light collecting lens 223 is fixed to a part in the vicinity of a tip portion of the reference light lens barrel 222 such that the focus is formed on a reference light mirror 224. The reference light mirror 224 is an example of a reference light reflection portion. A slight difference is provided between the optical path length of light incident on the objective optical system 220 to the focal position P and the optical path lengths of rays of light, which are reflected by the prism 221, are collected by the reference light collecting lens 223, and are concentrated on the reference light mirror 224, to the focus. It is preferable that this difference between the optical path lengths be 100 µm or shorter. In addition, the objective optical system 220 is configured to retain a uniform difference between the optical paths by moving the focus formed on the reference light collecting lens 223 on the reference light mirror 224 even in case that the optical scanner 31 performs scanning with light for irradiating the sample SP within a plane orthogonal to the optical axis AX and light incident on the objective optical system 220 tilts.

[Third Modification Example of First Embodiment]

Figure 7:
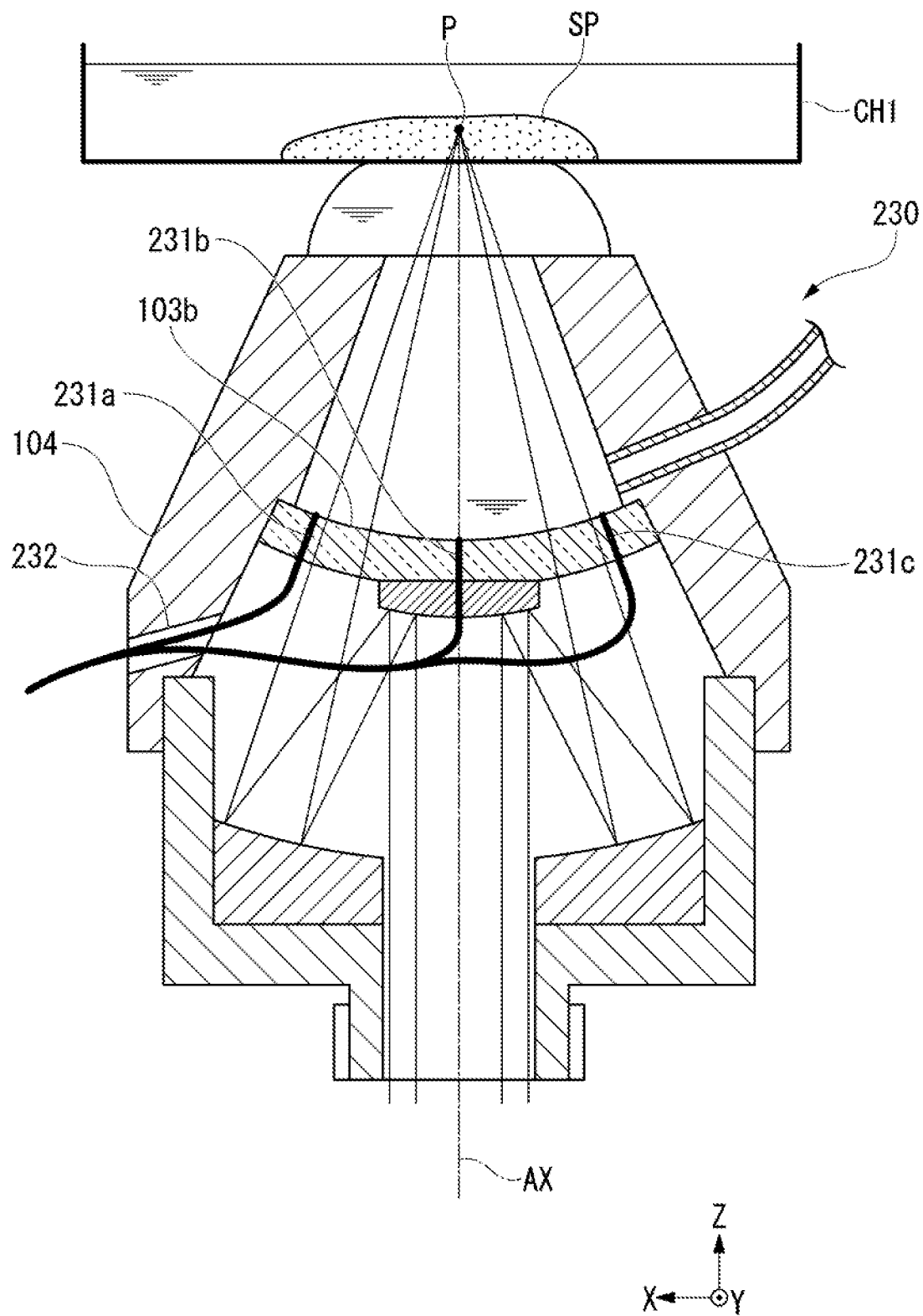
FIG. 7 is a cross-sectional view illustrating a configuration of a main part of an objective optical system according to a third modification example of the first embodiment of the present invention.

FIG. 7 is a cross-sectional view illustrating a configuration of a main part of an objective optical system 230 according to a third modification example of the first embodiment of the present invention. The objective optical system 230 of the third modification example of the first embodiment has the same basic configuration as the objective optical system 43 of the first embodiment, but the objective optical system 230 of the third modification example of the first embodiment differs from the objective optical system 43 of the first embodiment in that optical fiber sensors 231a to 231c are provided in the vicinity on the emission surface 103b of the cover member 103. In FIG. 7, for example, the optical fiber sensor 231b is included near the center on the emission surface 103b, and the optical fiber sensors 231a and 231c are included near the outer circumference on the emission surface 103b. However, one or more optical fiber sensors may be provided at arbitrary positions. The optical fiber sensors 231a to 231c are connected to respective optical fibers, and laser light passes through the optical fibers. A tip of each of the optical fiber sensors 231a to 231c is configured to have two parallel reflection surfaces facing each other at a predetermined cavity length. For example, the reflection surfaces are formed through thin film coating. The optical fiber sensors 231a to 231c are configure to serve as Fabry-Perot interferometers in which laser light is subjected to multiple reflection between two reflection surfaces facing each other. In case that acoustic waves such as ultrasound are transferred to the optical fiber sensors 231a to 231c, the distance (cavity length) between two reflection surfaces changes so that the interference state changes. A change in this interference state can be detected as the intensity of return light. Moreover, it is also possible to enhance the resolution by comprehensively analyzing information of a plurality of optical fiber sensors 231a to 231c. The optical fiber of each of these optical fiber sensors 231a to 231c is introduced to the outside of the objective optical system 230 through a hole portion 232 provided in a water receptacle 104 and is connected to the controller 60 through a wiring (not illustrated). A method of generating an image of the sample SP based on detection signals of acoustic waves (detection signals output from the optical fiber sensors 231a to 231c) obtained by irradiating the sample SP with light will be described in the following third embodiment.

Second Embodiment

<Imaging Device>

Figure 8:
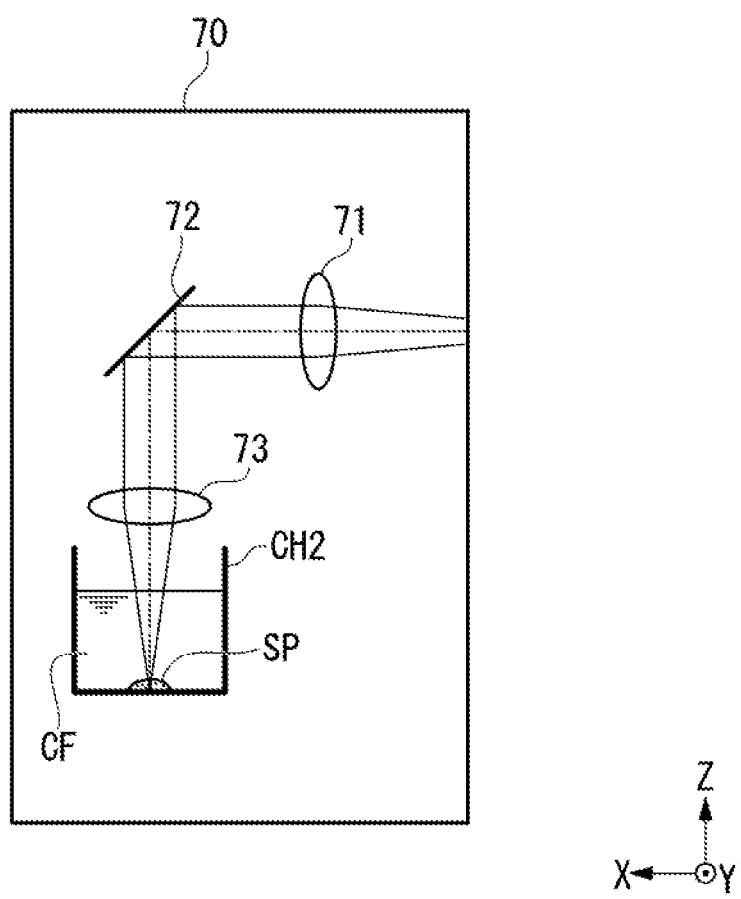
FIG. 8 is a view illustrating a part of a configuration of an imaging device including an objective optical system according to a second embodiment of the present invention.

FIG. 8 is a view illustrating a part of a configuration of an imaging device including an objective optical system according to a second embodiment of the present invention. FIG. 8 illustrates only an upright microscope 70 included in the imaging device. That is, the imaging device of the present embodiment has a configuration in which the inverted microscope 40 included in the imaging device 1 illustrated in FIG. 1 is replaced with the upright microscope 70 illustrated in FIG. 2.

The imaging device of the present embodiment generates an image of the sample SP based on interference light resulting from interference between fluorescence obtained by irradiating the sample SP stored in a sample container CH2 with laser light in a state in which the sample SP is immersed in the culture solution CF or backscattering light obtained by irradiating the sample SP with near infrared light and reference light. Similar to the first embodiment, the sample container CH2 is mounted on the electromotive stage (not illustrated) or the like, and scanning of the sample SP (scanning along the Z axis) is performed with laser light or near infrared light in accordance with control of the controller 60.

The upright microscope 70 includes an image forming lens 71, a mirror 72, and an objective optical system 73. The upright microscope 70 is used for observing the sample SP stored in the sample container CH2 from above (positive Z side). In FIG. 8 as well, the objective optical system 73 is illustrated in a shape of a lens for convenience. The image forming lens 71 is a lens for converting laser light or near infrared light which is emitted from the optical scanning unit 30 and is incident on the upright microscope 70 into parallel light. The mirror 72 is disposed on a side in the positive X direction from the image forming lens 71 and reflects laser light or near infrared light traveling in the positive X direction via the image forming lens 71 in the negative Z direction.

The objective optical system 73 is disposed on the negative Z side of the mirror 72, collects laser light or near infrared light reflected in the negative Z direction by the mirror 72 such that the sample SP is irradiated therewith, and converts fluorescence or backscattering light obtained from the sample SP into parallel light. Similar to the objective optical system 43 illustrated in FIG. 1, this objective optical system 73 can be configured to be able to move in the Z direction under control of the controller 60. Hereinafter, the objective optical system 73 will be described in detail.

<Objective Optical System>

Figure 9:
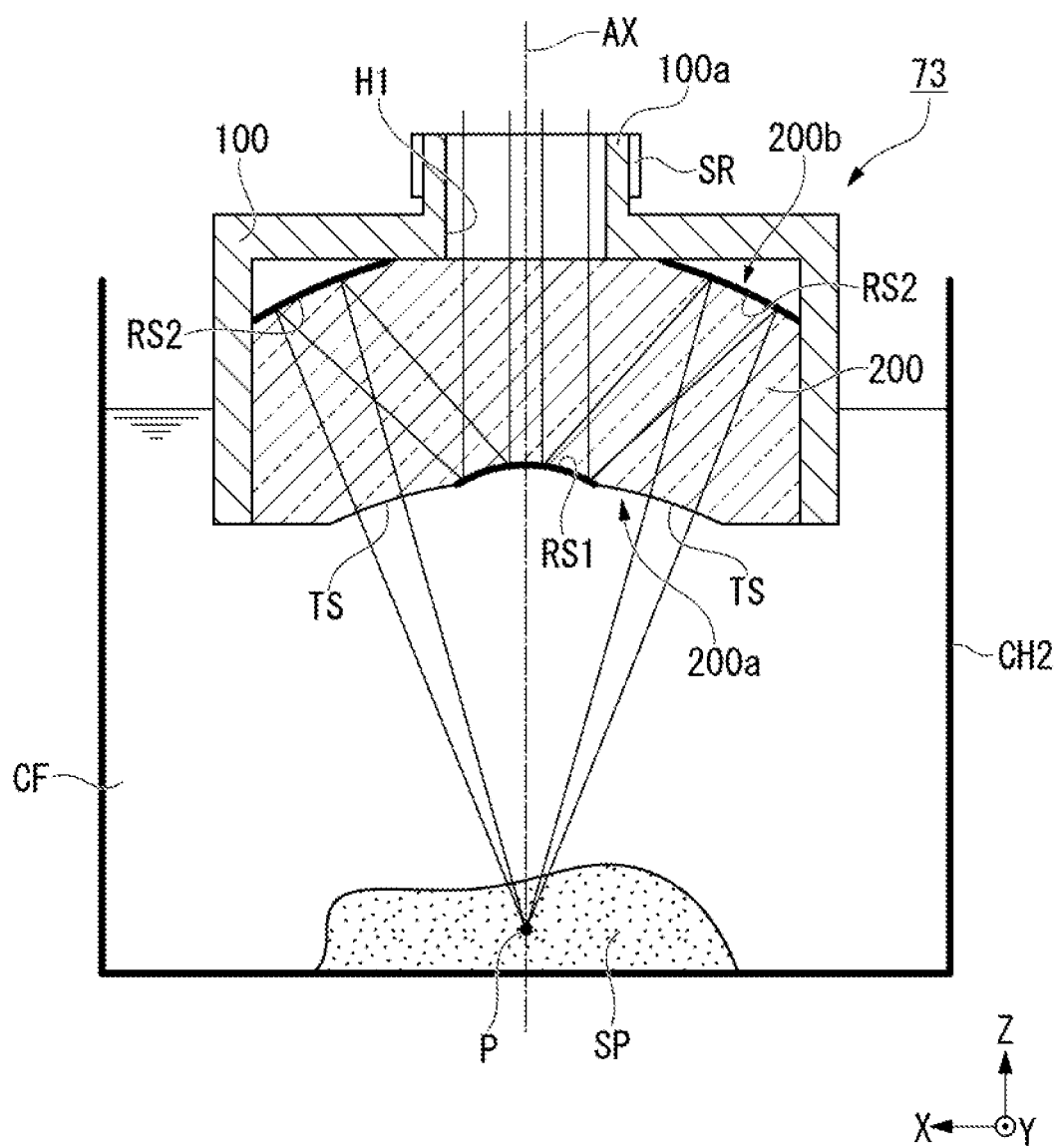
FIG. 9 is a cross-sectional view illustrating a configuration of a main part of the objective optical system according to the second embodiment of the present invention.

FIG. 9 is a cross-sectional view illustrating a configuration of a main part of the objective optical system according to the second embodiment of the present invention. In FIG. 9, the same reference signs are applied to members corresponding to the members illustrated in FIG. 2. As illustrated in FIG. 9, the objective optical system 73 of the present embodiment includes the lens barrel 100 and an optical member 200 and is used in a state in which a part of the lens barrel 100 and the optical member 200 is immersed in the culture solution CF in which the sample SP is immersed while the Z direction of the lens barrel 100 is directed in the opposite direction.

Similar to the lens barrel 100 illustrated in FIG. 2, the lens barrel 100 is a substantially toric member having a bottom and internally holds the optical member 200. The hole portion H1 through which laser light or near infrared light traveling toward the sample SP (laser light or near infrared light reflected in the negative Z direction by the mirror 72) passes is formed in the central portion on the bottom surface of the lens barrel 100. In addition, the protruding portion 100a, which has the same inner diameter as the hole portion H1, in which the screw portion SR is formed on the outer surface, which protrudes in the positive Z direction, is provided in the lens barrel 100. The objective optical system 73 is fixed to the upright microscope 70 by screwing the screw portion SR of the protruding portion 100a provided in the lens barrel 100 to the support member (not illustrated).

For example, the optical member 200 is a substantially columnar member which is formed of a glass, a transparent resin, or the like and has a first surface 200a formed to have a substantially concave shape and a second surface 200b formed to have a substantially convex shape. The convex reflection surface RS1 (convex reflection portion) is formed in the middle portion on the first surface 200a of the optical member 200, and the transmission portion TS is provided in a surrounding portion thereof. A middle portion on the second surface 200b of the optical member 200 is formed to be flat, and the concave reflection surface RS2 (concave reflection portion) is formed in a surrounding portion thereof. The diameter of the middle portion on the second surface 200b of the optical member 200 (the diameter of the part formed to be flat) is larger than the inner diameter of the hole portion H1 formed in the lens barrel 100.

The optical member 200 has an outer diameter approximately the same as the inner diameter of the lens barrel 100. The second surface 200b comes into contact with the bottom surface of the lens barrel 100 and is held by the lens barrel 100 such that the first surface 200a is directed toward the object side. The optical member 200 is held such that the middle portion on the second surface 200b thereof blocks the hole portion H1 formed in the lens barrel 100. For this reason, laser light or near infrared light traveling toward the sample SP (laser light or near infrared light reflected in the negative Z direction by the mirror 72) is incident on the middle portion on the second surface 200b of the optical member 200.

The reflection surface RS1 formed on the first surface 200a of the optical member 200 is disposed on the optical axis AX of laser light or near infrared light traveling toward the sample SP and reflects laser light or near infrared light traveling toward the sample SR The reflection surface RS2 formed on the second surface 200b of the optical member 200 reflects laser light or near infrared light reflected by the reflection surface RS1 toward the sample SR The reflection surface RS2 is designed such that laser light or near infrared light which has been reflected is collected in the sample SR.

The Schwarzschild-type reflection objective mirror is formed of the reflection surfaces RS1 and RS2.

For example, the reflection surface RS1 is formed by vapor-depositing a metal film in the middle portion on the first surface 200a of the optical member 200, and for example, the reflection surface RS2 is formed by vapor-depositing a metal film in the surrounding portion on the second surface 200b of the optical member 200. For example, it is desirable that a metal vapor-deposited in the optical member 200 be gold, silver, or the like having a high reflection factor with respect to light within an extensive wavelength range of UV light to near infrared light.

The transmission portion TS provided on the first surface 200a of the optical member 200 is a part through which laser light or near infrared light reflected by the reflection surface RS2 is transmitted. As illustrated in FIG. 9, since the transmission portion TS is immersed in the culture solution CF inside the sample container CH2, the transmission portion TS has a liquid contact surface coming into contact with the culture solution CF. The transmission portion TS is formed to be orthogonal to the optical path of laser light or near infrared light reflected by the reflection surface RS2. For example, the transmission portion TS is formed to be a spherical surface, and the center of curvature thereof is set to be equivalent to the focal position P of the reflection objective mirror formed of the reflection surfaces RS1 and RS2. The reason for this is to prevent a chromatic aberration from occurring across a wide wavelength bandwidth by preventing refraction (or preventing refraction as much as possible) from occurring in the transmission portion TS (an interface between the optical member 200 and the culture solution CF).

<Operation of Imaging Device>

Operation of the imaging device of the present embodiment (operation during generation of a fluorescence image and operation during generation of an OCT image) is the same as the first embodiment except for operation inside the upright microscope 70. For this reason, hereinafter, operation inside the upright microscope 70 will be described. In addition, hereinafter, in order to avoid redundant description, operation inside the upright microscope 70 during generation of a fluorescence image and operation inside the upright microscope 70 during generation of an OCT image will be described collectively.

In case that laser light or near infrared light emitted from the optical scanning unit 30 is incident on the upright microscope 70, the laser light or near infrared light goes through the image forming lens 71, is reflected in the negative Z direction by the mirror 72 thereafter, and is incident on the objective optical system 73. Laser light or near infrared light incident on the objective optical system 73 passes through the hole portion H1 formed in the lens barrel 100 and is incident inside the optical member 200 from the middle portion on the second surface 200b of the optical member 200 thereafter. Laser light or near infrared light incident inside the optical member 200 is reflected by the reflection surface RS1 and is incident on and reflected by the reflection surface RS2 thereafter. Laser light or near infrared light reflected by the reflection surface RS2 is emitted to the outside of the optical member 200 from the transmission portion TS provided on the first surface 200a of the optical member 200. Laser light or near infrared light emitted from the optical member 200 goes through the culture solution CF inside the sample container CH2, and the inside of the sample SP is irradiated with the laser light or near infrared light.

Here, the transmission portion TS of the optical member 200 is formed to be orthogonal to the optical path of laser light or near infrared light reflected by the reflection surface RS2. For this reason, laser light or near infrared light reflected by the reflection surface RS2 is emitted in a direction perpendicular to the transmission portion TS. For this reason, laser light or near infrared light reflected by the reflection surface RS2 travels straight ahead without being refracted in case that it is incident on the culture solution CF from the optical member 200.

In addition, due to the culture solution CF inside the sample container CH2, the optical path of laser light or near infrared light emitted from the optical member 200 has a refractive index close to the refractive index of the sample SR For this reason, reflection of laser light or near infrared light emitted from the optical member 200 (reflection on the front surface of the sample SP) is extremely reduced, and much laser light is incident inside the sample SP. In addition, refraction of laser light or near infrared light emitted from the optical member 200 (refraction on the front surface of the sample SP) is extremely reduced as well, and a great part of laser light or near infrared light emitted from the optical member 200 travels straight ahead and is collected at the focal position P. In this manner, since refraction of laser light or near infrared light seldom occurs in the objective optical system 73 of the present embodiment as well, laser light can be focused on the original focal position P of the Schwarzschild-type reflection objective mirror formed of the reflection surfaces RS1 and RS2.

In case that the sample SP is irradiated with laser light or near infrared light, fluorescence is radiated from a fluorescent substance included in the sample SP, or backscattering light is radiated from the sample SR Fluorescence or backscattering light radiated from the sample SP travels along the optical path of laser light or near infrared light in the opposite direction. As illustrated in FIG. 9, since the reflection surface RS1 is disposed on the optical axis AX, a cross-sectional shape (a shape of a surface perpendicular to the optical axis AX) of fluorescence or backscattering light emitted from the objective optical system 73 becomes a ring shape.

As described above, in the present embodiment, the objective optical system 73 is configured to use the optical member 200 in which the reflection surface RS1 is formed in the middle portion on the first surface 200a, the reflection surface RS2 is formed in the surrounding portion on the second surface 200b, and the transmission portion TS formed to be orthogonal to the optical path of light reflected by the reflection surface RS2 is provided in the surrounding portion on the first surface 200a. Further, the objective optical system 73 is used in a state in which the first surface 200a of the optical member 200 comes into contact with the culture solution CF inside the sample container CH2.

For this reason, in both cases such as a case in which the sample SP is irradiated with laser light and case in which the sample SP is irradiated with near infrared light, refraction seldom occurs in the objective optical system 73. Therefore, a chromatic aberration seldom occurs. For this reason, it is possible to cope with light within an extensive wavelength range of UV light to near infrared light using one objective optical system 73. Accordingly, images at the same observation places obtained by simultaneously performing observation using light having various wavelengths can be superimposed. In addition, not only a chromatic aberration but also various aberrations caused by tropism can be reduced. Moreover, in the present embodiment, since the sample SP is observed through liquid immersion, the resolution can be enhanced compared to in case that the sample SP is observed without depending on liquid immersion.

In addition, in the present embodiment, the Schwarzschild-type reflection objective mirror is formed of only the optical member 200. For this reason, the number of components can be further reduced than that in the first embodiment. Therefore, the cost can be reduced and assembly man-hours can be reduced. Moreover, since the Schwarzschild-type reflection objective mirror is formed by vapor-depositing a metal in the optical member 200, relative positional misalignment between the reflection surfaces RS1 and RS2 due to vibration or the like can be further reduced than that in the first embodiment.

Third Embodiment

<Imaging Device and Objective Optical System>

Figure 10:
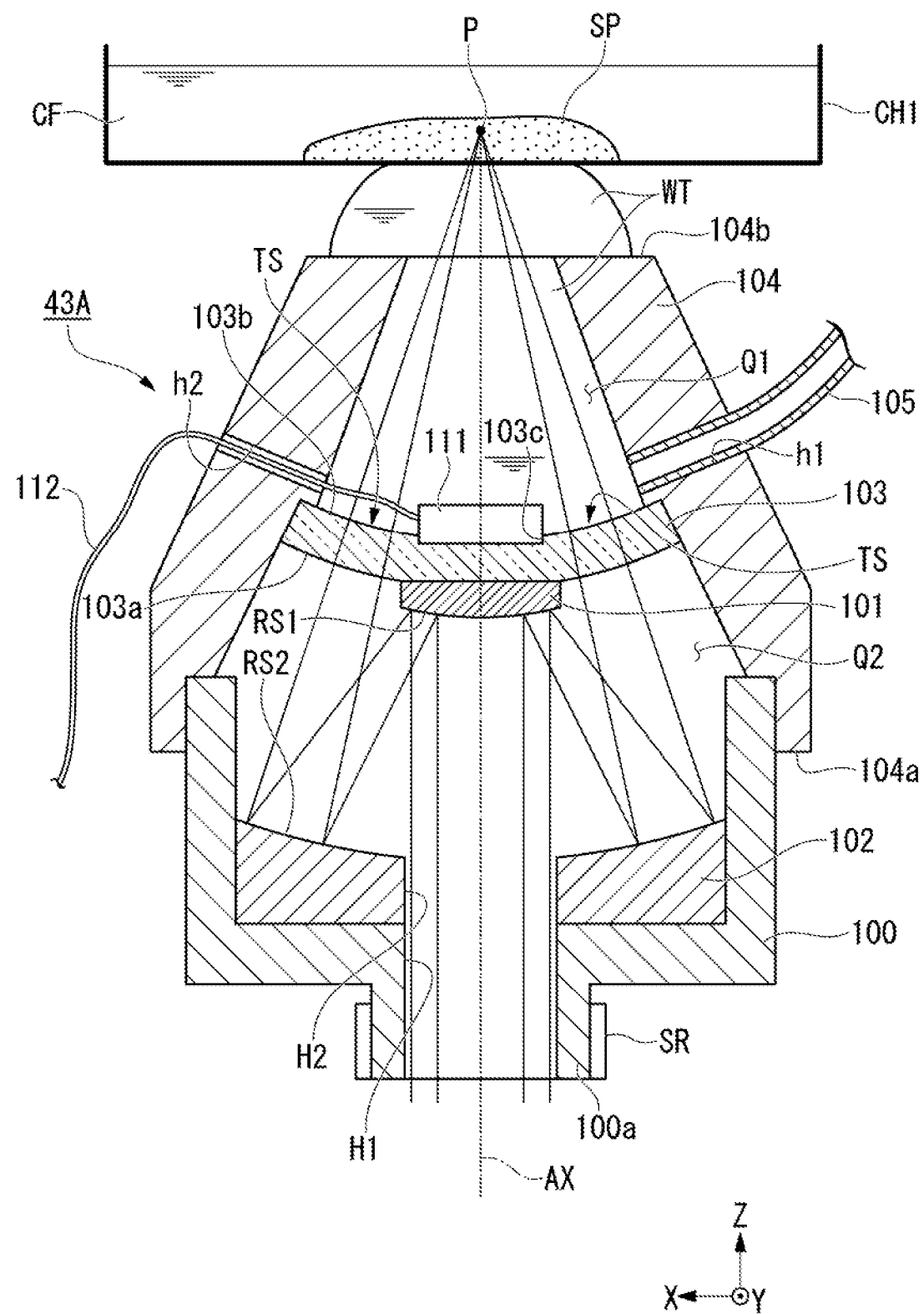
FIG. 10 is a cross-sectional view illustrating a configuration of a main part of an objective optical system according to a third embodiment of the present invention.

FIG. 10 is a cross-sectional view illustrating a configuration of a main part of an objective optical system according to the third embodiment of the present invention. In FIG. 10, the same reference signs are applied to members corresponding to the members illustrated in FIG. 2. As illustrated in FIG. 10, an objective optical system 43A of the present embodiment has a configuration in which an ultrasound detector 111 is added to the objective optical system 43 illustrated in FIG. 2.

The imaging device of the present embodiment has a configuration in which the objective optical system 43 included in the inverted microscope 40 illustrated in FIG. 1 is replaced with the objective optical system 43A illustrated in FIG. 10 and the laser light source 11 illustrated in FIG. 1 is enabled to emit pulsed laser light (which will hereinafter be referred to as pulsed light). The controller 60 included in the imaging device of the present embodiment generates an image of the sample SP based on a detection signal of acoustic waves (a detection signal output from the ultrasound detector 111) obtained by irradiating the sample SP with pulsed light. Hereinafter, an image based on acoustic waves obtained from the sample SP will be referred to as "a photo-acoustic image".

The ultrasound detector 111 is provided on the emission surface 103b of the cover member 103 in a state in which a detection surface thereof is directed toward the sample SP side (positive Z side) and detects acoustic waves obtained by irradiating the sample SP with pulsed light. Specifically, the ultrasound detector 111 is disposed inside a concave portion 103c formed in the middle portion on the emission surface 103b of the cover member 103 and is provided on the emission surface 103b of the cover member 103 such that it overlaps the convex mirror 101 in case that viewed in the Z direction. In this manner, the convex mirror 101 is disposed in the middle portion on the incidence surface 103a of the cover member 103, and the ultrasound detector 111 is disposed in the middle portion on the emission surface 103b of the cover member 103.

Figure 11:
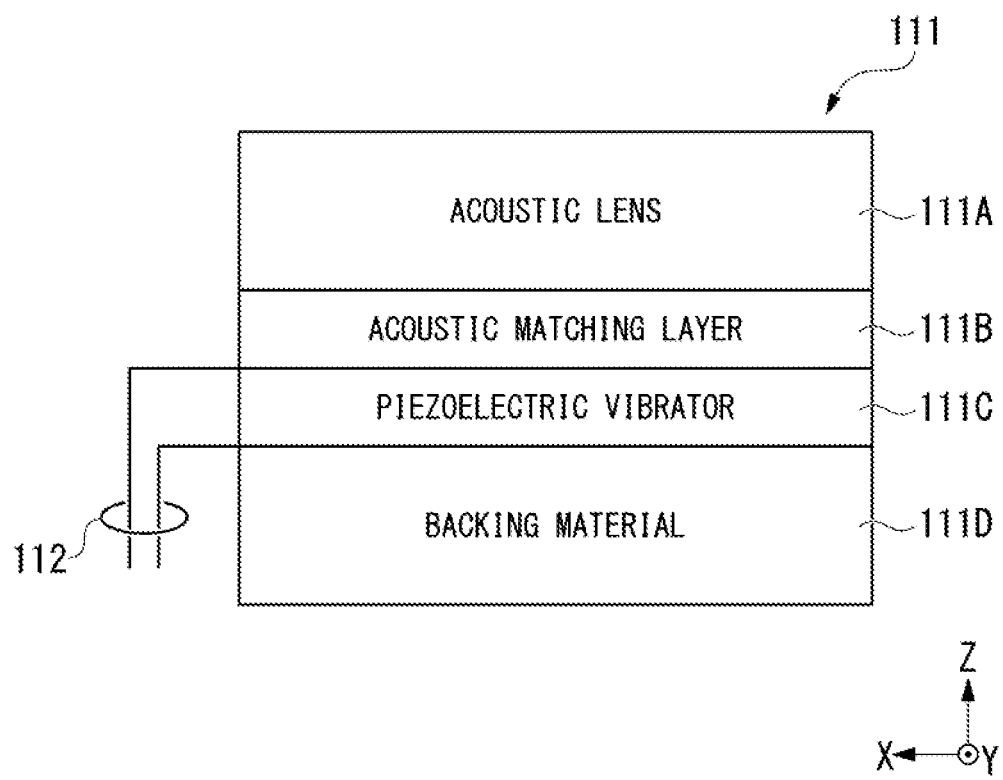
FIG. 11 is a cross-sectional view schematically illustrating a configuration of a main part of an ultrasound detector in the third embodiment of the present invention.

FIG. 11 is a cross-sectional view schematically illustrating a configuration of a main part of an ultrasound detector in the third embodiment of the present invention. As illustrated in FIG. 11, the ultrasound detector 111 includes an acoustic lens 111A, an acoustic matching layer 111B, a piezoelectric vibrator 111C, and a backing material 111D. This ultrasound detector 111 is supported by the cover member 103 by being disposed inside the concave portion 103c in which the backing material 111D is formed on the emission surface 103b of the cover member 103 in a state in which the acoustic lens 111A is directed toward the object side (sample SP side).

The acoustic lens 111A collects acoustic waves (collects sound) obtained by irradiating the sample SP with pulsed light. Specifically, the acoustic lens 111A selectively collects acoustic waves generated near a focus of pulsed light. The acoustic matching layer 111B is a layer for matching an acoustic impedance. The acoustic lens 111A is bonded to one surface of the acoustic matching layer 111B. The piezoelectric vibrator 111C is bonded to the other surface of the acoustic matching layer 111B.

The piezoelectric vibrator 111C is an element detecting acoustic waves via the acoustic lens 111A and the acoustic matching layer 111B and outputting a detection signal. Electrodes (not illustrated) are provided respectively on both surfaces of this piezoelectric vibrator 111C, and a wiring 107 is electrically connected to each of the electrodes. A detection signal of the piezoelectric vibrator 111C is output from the wiring 107. The backing material 111D curbs unnecessary vibration of the piezoelectric vibrator 111C and is bonded to a rear surface (a surface on a side opposite to the surface to which the acoustic matching layer 111B is bonded) of the piezoelectric vibrator 111C.

As illustrated in FIG. 1, in addition to the hole portion h1 in which the supply tube 105 is inserted, the hole portion h2 communicating with the internal space Q1 of the water receiving member 104 and the outside of the water receiving member 104 is formed on the side surface of the water receiving member 104. The wiring 107 of the ultrasound detector 111 is drawn to the outside of the water receiving member 104 via the hole portion h2 formed in the water receiving member 104 and is connected to the controller 60. A detection signal of the ultrasound detector 111 is output to the controller 60 via the wiring 107.

<Operation of Imaging Device>

Operation of the imaging device of the present embodiment during generation of a fluorescence image and operation during generation of an OCT image are similar to those in the first embodiment. For this reason, hereinafter, description of operation during generation of a fluorescence image and operation during generation of an OCT image will be omitted, and operation during generation of a photo-acoustic image will be described. In case that operation of the imaging device 1 starts, first, the laser light source 11 of the confocal unit 10 is controlled by the controller 60, pulsed light is emitted from the laser light source 11. The sample SP is irradiated with pulsed light emitted from the laser light source 11 via an optical path similar to that of laser light during generation of a fluorescence image in the first embodiment.

Here, in case that there is a substance absorbing irradiated pulsed light inside the sample SP, the sample SP is locally warmed and expands rapidly, and acoustic waves are locally radiated from the sample SP in accordance therewith. The acoustic waves pass through the sample container CH1 and are detected by the ultrasound detector 111 thereafter through the liquid WT held between the sample container CH1 and the water receiving member 104 and the liquid WT held in the internal space Q1 of the water receiving member 104.

In the present embodiment as well, similar to the first embodiment, it is preferable to use the sample container CH1 including a bottom portion having a thin plate thickness to reduce fluctuation in optical path caused by refraction in case that pulsed light is transmitted through the bottom portion of the sample container CH1. Moreover, in consideration of transmission of acoustic waves, it is preferable that the sample container CH1 be formed of a material of which an acoustic impedance density is close to the acoustic impedance density of the liquid WT. For example, in case that the sample container CH1 is formed of a resin such as polystyrene, the acoustic impedance thereof becomes closer to the acoustic impedance of the liquid WT compared to in case that it is formed of a glass. Accordingly, a loss of ultrasound transmission is reduced, which is preferable.

At this time, in the ultrasound detector 111, acoustic waves generated near the focus of pulsed light are selectively collected by the acoustic lens 111A illustrated in FIG. 11, and a great part of the acoustic waves are efficiently transferred to the piezoelectric vibrator 111C by the acoustic matching layer 111B without being reflected and are converted into electrical signals (detection signals). Unnecessary vibration of the piezoelectric vibrator 111C is curbed by the backing material 111D bonded to the piezoelectric vibrator 111C. For this reason, a detection signal having a high signal level and less noise is output from the piezoelectric vibrator 111C.

A detection signal of the ultrasound detector 111 is output to the controller 60, is converted into a digital signal, and is associated with the scanning position (the scanning position for the optical scanner 31 within the XY plane and the scanning position in the Z direction for the electromotive stage (not illustrated) or the like for mounting the sample container CH1). The foregoing operation is performed while the scanning position for the optical scanner 31 within the XY plane is changed (further, while the scanning position in the Z direction for the electromotive stage (not illustrated) or the like for mounting the sample container CH1 is changed). In case that such operation is performed, a two-dimensional or three-dimensional photo-acoustic image is generated. A generated photo-acoustic image may be displayed by the display monitor 61 or may be stored in a memory (not illustrated) inside thereof.

As described above, in the present embodiment, in place of the objective optical system 43 illustrated in FIG. 2, the objective optical system 43A having a configuration in which the ultrasound detector 111 is added to the objective optical system 43 illustrated in FIG. 2 is used. For this reason, it is possible to cope with light within an extensive wavelength range of UV light to near infrared light using one objective optical system 43A, and it is also possible to detect acoustic waves obtained by irradiating the sample SP with pulsed light. Accordingly, images (fluorescence images, OCT images, and photo-acoustic images) at the same observation places obtained by simultaneously performing observation using light having various wavelengths can be superimposed. In addition, not only a chromatic aberration but also various aberrations caused by tropism can be reduced. Moreover, in the present embodiment, since the sample SP is observed through liquid immersion, the resolution can be enhanced compared to in case that the sample SP is observed without depending on liquid immersion.

Fourth Embodiment

<Imaging Device and Objective Optical System>

Figure 12:
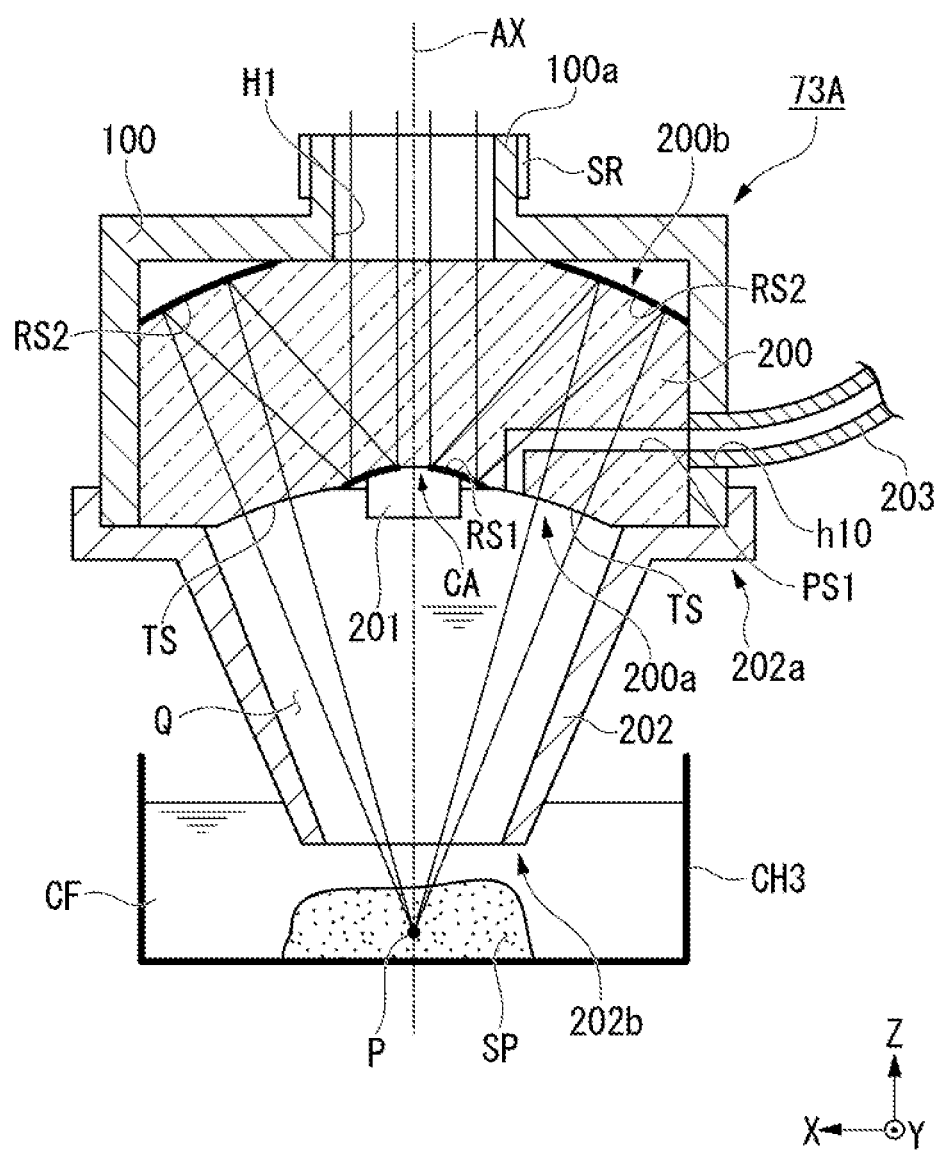
FIG. 12 is a cross-sectional view illustrating a configuration of a main part of an objective optical system according to a fourth embodiment of the present invention.

FIG. 12 is a cross-sectional view illustrating a configuration of a main part of an objective optical system according to a fourth embodiment of the present invention. In FIG. 12, the same reference signs are applied to members corresponding to the members illustrated in FIG. 9. As illustrated in FIG. 12, an objective optical system 73A of the present embodiment has a configuration in which an ultrasound detector 201, a water receiving member 202 (liquid holding member), and a suction tube 203 (liquid introduction portion) are added to the objective optical system 73 illustrated in FIG. 9. In addition, the objective optical system 73A of the present embodiment differs from the objective optical system 73 illustrated in FIG. 9 in that a hole portion h10 is formed on a side surface of the lens barrel 100 and a communication path PS1 communicating with the transmission portion TS from a side surface of the optical member 200 is formed inside the optical member 200.

In addition, the objective optical system 73A of the present embodiment also differs from the objective optical system 73 illustrated in FIG. 9 in that a central portion CA on the reflection surface RS1 has a lower reflection factor than other parts on the reflection surface RS1. Since light reflected by the central portion CA on the reflection surface RS1 becomes noise in case that it is incident on the OCT unit 50, noise is reduced by causing the reflection factor of the central portion CA on the reflection surface RS1 to be lower than the reflection factors of other parts on the reflection surface RS1 and reducing the foregoing return light. Examples of a method of decreasing the reflection factor of the central portion CA on the reflection surface RS1 include a method of vapor-depositing no metal in the central portion CA on the reflection surface RS1 or a method of removing a metal vapor-deposited in the central portion CA on the reflection surface RS1.

The imaging device of the present embodiment has a configuration in which a microscope having the objective optical system 73A illustrated in FIG. 12 replacing the objective optical system 73 included in the upright microscope 70 illustrated in FIG. 8 is provided in place of the inverted microscope 40 illustrated in FIG. 1 and the laser light source 11 illustrated in FIG. 1 is enable to emit pulsed light. Similar to the third embodiment, the controller 60 included in the imaging device of the present embodiment can generate a photo-acoustic image of the sample SP based on a detection signal output from the ultrasound detector 201.

The ultrasound detector 201 is similar to the ultrasound detector 111 illustrated in FIG. 10. That is, the ultrasound detector 201 is configured to include the acoustic lens 111A, the acoustic matching layer 111B, the piezoelectric vibrator 1110, and the backing material 111D illustrated in FIG. 11. This ultrasound detector 201 is provided in the middle portion on the first surface 200a of the optical member 200 in a state in which a detection surface thereof is directed toward the sample SP side (negative Z side). As illustrated in FIG. 12, since the ultrasound detector 201 is attached to a surface on a side opposite to the reflection surface RS1, the sample SP is not irradiated with light which has been transmitted through the central portion CA on the reflection surface RS1. In FIG. 12, illustration of a wiring (a wiring corresponding to a wiring 112 in FIG. 10) connected to the ultrasound detector 201 and a hole portion (a hole portion corresponding to the hole portion h2 in FIG. 10) formed in the water receiving member 202 is omitted. The ultrasound detector 201 is connected to the controller 60 via a wiring (not illustrated).

The water receiving member 202 is a tubular member having a diameter decreasing from a first end portion 202a toward a second end portion 202b, and the first end portion 202a is attached to the end portion of the lens barrel 100 on the object side. The diameter of a tip of the second end portion 202b of the water receiving member 202 is set to be smaller than the diameter of a sample container CH3 storing the sample SP. Accordingly, the second end portion 202b of the water receiving member 202 can be in a state of being infiltrated into the culture solution CF inside the sample container CH3.

The suction tube 203 is a tube for supplying the liquid WT to an internal space Q of the water receiving member 202. For example, the suction tube 203 is formed of a rubber or a resin, in which the first end portion is inserted into the hole portion h10 formed on the side surface of the lens barrel 100 and the second end portion is connected to a suction pump (not illustrated). As illustrated in FIG. 12, the optical member 200 is disposed such that the communication path PSI communicates with the hole portion h10 formed in the lens barrel 100. For this reason, the culture solution CF inside the sample container CH3 is introduced to the internal space Q of the water receiving member 202 and the culture solution CF can be in a state of being held in the internal space Q of the water receiving member 202 (a state in which the internal space Q of the water receiving member 202 is filled with the culture solution CF) by operating the suction pump (not illustrated).

<Operation of Imaging Device>

Operation during generation of a fluorescence image and operation during generation of an OCT image of the imaging device of the present embodiment are similar to those in the second embodiment. In addition, operation during generation of a photo-acoustic image of the present embodiment is substantially similar to that in the third embodiment except that pulsed light vertically illuminates the sample SP. For this reason, description of operation of the imaging device of the present embodiment will be omitted.

As described above, in the present embodiment, in place of the objective optical system 73 illustrated in FIG. 9, the objective optical system 73A having a configuration in which the ultrasound detector 201, the water receiving member 202, the suction tube 203, and the like are added to the objective optical system 73 illustrated in FIG. 9 is used. For this reason, similar to the third embodiment, it is possible to cope with light within an extensive wavelength range of UV light to near infrared light using one objective optical system 73A, and it is also possible to detect acoustic waves obtained by irradiating the sample SP with pulsed light. Accordingly, images (fluorescence images, OCT images, and photo-acoustic images) at the same observation places obtained by simultaneously performing observation using light having various wavelengths can be superimposed. In addition, not only a chromatic aberration but also various aberrations caused by tropism can be reduced. Moreover, in the present embodiment, since the sample SP is observed through liquid immersion, the resolution can be enhanced compared to in case that the sample SP is observed without depending on liquid immersion.

Fifth Embodiment

<Objective Optical System>

Figure 13:
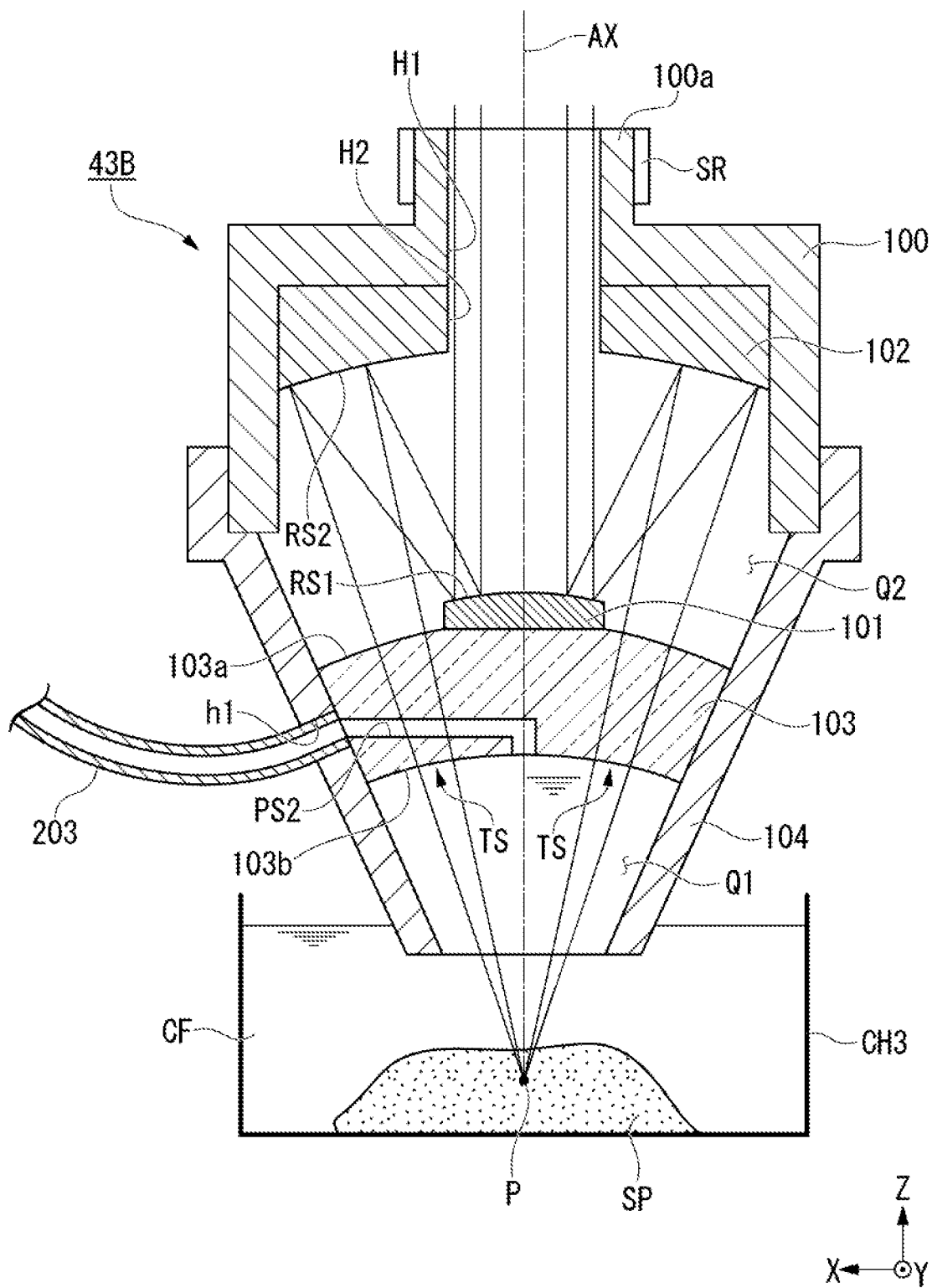
FIG. 13 is a cross-sectional view illustrating a configuration of a main part of an objective optical system according to a fifth embodiment of the present invention.

FIG. 13 is a cross-sectional view illustrating a configuration of a main part of an objective optical system according to a fifth embodiment of the present invention. In FIG. 13, the same reference signs are applied to members corresponding to the members illustrated in FIG. 2 or 12.

As illustrated in FIG. 13, an objective optical system 43B of the present embodiment is obtained by reforming the objective optical system 43 illustrated in FIG. 2 to be able to be used in the upright microscope 70.

As illustrated in FIG. 13, the objective optical system 43B of the present embodiment includes a cover member 103 which is thicker than the cover member 103 illustrated in FIG. 2 and in which a communication path PS2 communicating with the middle portion on the emission surface 103b from a side surface is formed. The cover member 103 is disposed such that the communication path PS2 communicates with the hole portion h1 formed in the water receiving member 104. A first end of the suction tube 203 of which the second end portion is connected to a. suction pump (not illustrated) is inserted into the hole portion h1 formed on the side surface of the water receiving member 104. For this reason, the culture solution CF inside the sample container CH3 is introduced to the internal space Q1 of the water receiving member 104 and the culture solution CF can be in a state of being held in the internal space Q1 of the water receiving member 104 (a state in which the internal space Q1 of the water receiving member 104 is filled with. the culture solution CF) by operating the suction pump (not illustrated).

As described above, the objective optical system 43B of the present embodiment is obtained by only reforming the objective optical system 43 illustrated in FIG. 2 to be able to be used in the upright microscope 70, and the optical characteristics thereof are similar to those of the objective optical system 43 illustrated in FIG. 2. For this reason, it is possible to cope with light within an extensive wavelength range of UV light to near infrared light using one objective optical system 43B. Accordingly, images at the same observation places obtained by simultaneously performing observation using light having various wavelengths can be superimposed. In addition, not only a chromatic aberration but also various aberrations caused by tropism can be reduced. Moreover, in the present embodiment, since the sample SP is observed through liquid immersion, the resolution can be enhanced compared to in case that the sample SP is observed without depending on liquid immersion.

Sixth Embodiment

<Objective Optical System>

Figure 14:
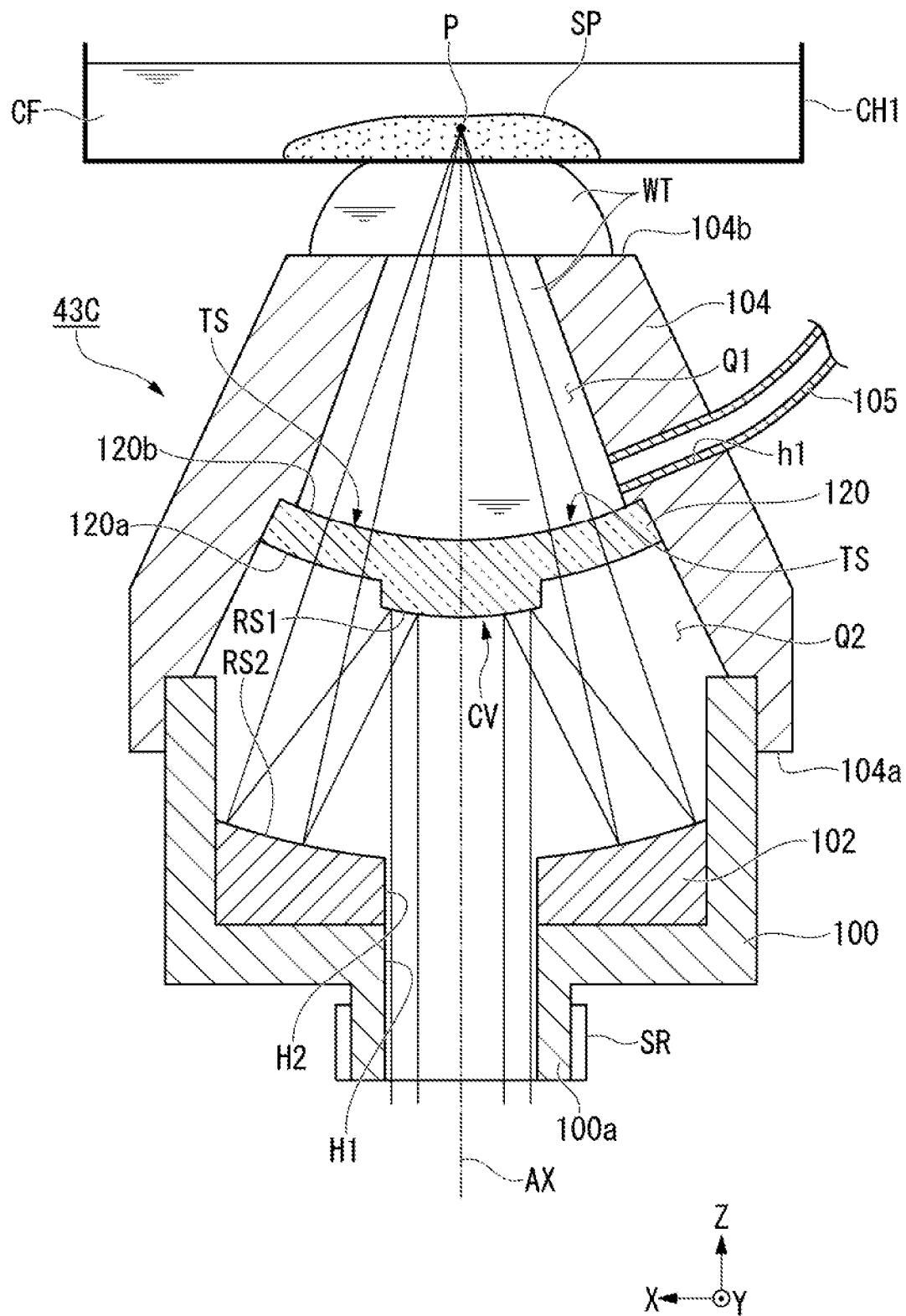
FIG. 14 is a cross-sectional view illustrating a configuration of a main part of an objective optical system according to a sixth embodiment of the present invention.

FIG. 14 is a cross-sectional view illustrating a configuration of a main part of an objective optical system according to a sixth embodiment of the present invention. In FIG. 14, the same reference signs are applied to members corresponding to the members illustrated in FIG. 2. As illustrated in FIG. 14, an objective optical system 43C of the present embodiment has a configuration in which the convex mirror 101 and the cover member 103 of the objective optical system 43 illustrated in FIG. 2 are replaced with a cover member 120. That is, the objective optical system 43C of the present embodiment has a configuration in which the cover member 120 having an integrated function of the convex mirror 101 and the cover member 103 configured as separate members in the objective optical system 43 illustrated in FIG. 2 is provided in place of the convex mirror 101 and the cover member 103.

Similar to the cover member 103, for example, the cover member 120 is a member formed of a glass, a transparent resin, or the like having a partially spherical shell shape and includes an incidence surface 120a corresponding to the incidence surface 103a of the cover member 103 and an emission surface 120b corresponding to the emission surface 103b of the cover member 103. A convex surface CV having a convex shape on the negative Z side is formed in the middle portion on the incidence surface 120a of this cover member 120. Since it is difficult to form the cover member 120 having such a shape through polishing, it is preferable that the cover member 120 be formed through injection molding or the like, for example. A metal film is vapor-deposited on the convex surface CV of the cover member 120, for example, and serves as the reflection surface RS1.

As described above, in the objective optical system 43C of the present embodiment, the convex mirror 101 and the cover member 103 included in the objective optical system 43 illustrated in FIG. 2 are only replaced with the cover member 120 having an integrated function thereof, and the optical characteristics thereof are similar to those of the objective optical system 43 illustrated in FIG. 2. For this reason, it is possible to cope with light within an extensive wavelength range of UV light to near infrared light using one objective optical system 43C. Accordingly, images at the same observation places obtained by simultaneously performing observation using light having various wavelengths can be superimposed. In addition, not only a chromatic aberration but also various aberrations caused by tropism can be reduced. Moreover, in the present embodiment, since the sample SP is observed through liquid immersion, the resolution can be enhanced compared to in case that the sample SP is observed without depending on liquid immersion. In addition, in the present embodiment, assembly man-hours can be curtailed at lower cost than in the first embodiment.

Modification Example

Figure 15:
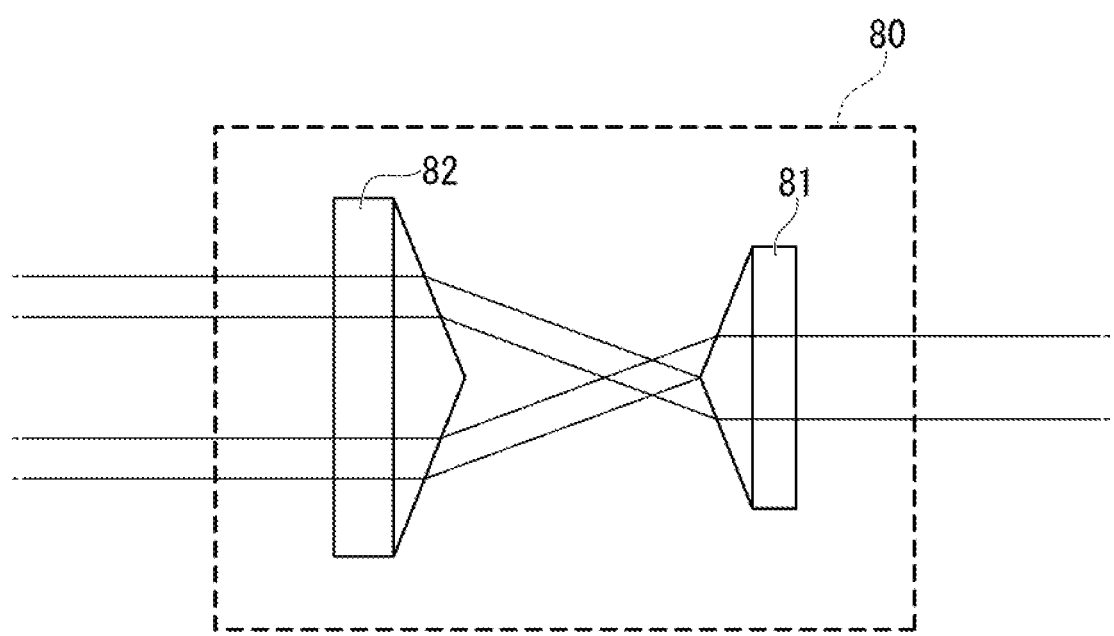
FIG. 15 is a view illustrating a configuration of an optical system provided in an imaging device.

FIG. 15 is a view illustrating a configuration of an optical system provided in an imaging device. As illustrated in FIG. 15, an optical system 80 is an optical system which includes two axicon lenses 81 and 82 disposed such that their vertical angles face each other and converts the cross-sectional shape (the shape of a surface perpendicular to the optical axis) of incident light. Specifically, the optical system 80 illustrated in FIG. 15 converts light having a circular cross section and traveling from the right side in the diagram toward the left side in the diagram into light having a ring-shaped cross section. In contrast, the optical system 80 converts light having a ring-shaped cross section and traveling from the left side in the diagram toward the right side in the diagram into light having a circular cross section.

For example, it is desirable that such an optical system 80 be disposed on an optical path from the laser light source 11 provided in the confocal unit 10 illustrated in FIG. 1 to the optical scanner 31 provided in the optical scanning unit 30 or an optical path from the broadband light source 51 provided in the OCT unit 50 to the optical scanner 31 provided in the optical scanning unit 30. Due to such disposition, light incident on the objective optical system 43 illustrated in FIG. 2 (light incident on the reflection surface RS1) can have a ring-shaped cross section. Accordingly, light incident on the central portion on the reflection surface RS1 which does not contribute to measurement can be eliminated, and therefore utilizing efficiency of light can be enhanced. Moreover, light reflected by the central portion on the reflection surface RS1 can be eliminated, and therefore noise can be reduced.

A cross section of fluorescence or backscattering light at the time in case that fluorescence or backscattering light obtained by irradiating the sample SP with laser light or near infrared light is emitted from the objective optical system 43 has a ring shape, but it is converted into fluorescence or backscattering light having a circular cross section by passing through the optical system 80 illustrated in FIG. 15. For this reason, even if the optical system 80 illustrated in FIG. 15 is inserted, fluorescence or backscattering light (return light) is not affected. The optical system 80 illustrated in FIG. 15 can also be applied to imaging devices of other embodiments other than the imaging device 1 of the first embodiment illustrated in FIG. 1.

Hereinabove, the objective optical systems according to the embodiments of the present invention have been described. However, the present invention is not limited to the foregoing embodiments and can be freely changed within the scope of the present invention. Examples in which the incidence surface 103a (except for the middle portion) and the emission surface 103b of the cover member 103 are formed to be orthogonal to the optical path of laser light reflected by the concave mirror 102 in the first, third, and fifth embodiments described above; the first surface 200a (the transmission portion TS except for the middle portion) of the optical member 200 is formed to be orthogonal to the optical path of laser light or near infrared light reflected by the reflection surface RS2 in the second and fourth embodiments described above; and the incidence surface 120a (except for the middle portion) and the emission surface 120b of the cover member 120 are formed to be orthogonal to the optical path of laser light reflected by the concave mirror 102 in the sixth embodiment have been described.

However, the shapes of the incidence surfaces 103a and 120a, the emission surfaces 103b and 120b, and the transmission portion TS can be changed if there is little refraction in an interface with respect to the liquid WT or the like and the resolution does not deteriorate significantly. For example, taking the cover member 103 as an example, the shape of the incidence surface 103a (except for the middle portion) or the emission surface 103b can be changed such that a radius r of curvature at an arbitrary point on the incidence surface 103a (except for the middle portion) or the emission surface 103b satisfies a relational expression $0.7\,S \leq r \leq 1.3\,S$ in case that a distance from the point to the focal position P is S. In addition, the upper surfaces of the incidence surface 103a (except for the middle portion) and the emission surface 103b are not limited to spherical surfaces, and aspherical surfaces may be adopted.

In addition, in the embodiments described above, an example in which the sample SP is observed through liquid immersion using the liquid WT such as water has been described. However, the liquid WT is not limited to water, and the liquid WT may be an arbitrary liquid suitable for observing the sample SR For example, silicone oil or the like having a refractive index close to that of a sample SP of a living body may be used. In addition, in the embodiments described above, an example in which light (visible light) having a wavelength bandwidth within a range of approximately 400 to 700 [nm], for example, is used in case that "a fluorescence image" is generated has been described. However, UV light or infrared light may be used. In addition, the OCT unit 50 in the embodiments described above is a time domain optical coherence tomography (TD-OCT) unit, but the OCT unit 50 may be a spectral domain optical coherence tomography (SD-OCT) unit or the like.

[Microscope System]

Commercially available microscopes include microscopes of an independent correction type individually correcting a chromatic aberration in objective optical systems and image forming lenses using each of the optical systems, and microscopes of a compensation type performing correction using a combination of objective optical systems and image forming lenses. It is necessary to pay attention in case that the objective optical systems 43, 43A to 43C, 73, and 73A of the respective embodiments described above are used in a compensation-type microscope. Since the objective optical systems 43, 43A to 43C, 73, and 73A of the respective embodiments described above are optical systems which independently correct a chromatic aberration (a chromatic aberration seldom occurs), if image forming lenses used in a compensation-type microscope and the objective optical systems 43, 43A to 43C, 73, and 73A of the respective embodiments described above are combined, a chromatic aberration occurs on the contrary.

In case that such a chromatic aberration occurs, it is preferable to adopt a microscope system correcting the foregoing chromatic aberration by providing a correction lens system inside or outside the microscope. For example, taking the inverted microscope 40 of the first embodiment as an example, the foregoing microscope system can be realized by causing the image forming lens 41 provided in the inverted microscope 40 to serve as a correction lens system capable of correcting the foregoing chromatic aberration. Alternatively, the foregoing microscope system can be realized by causing the pupil projection lens 32 provided in the optical scanning unit 30 (a lens provided outside the inverted microscope 40) to serve as a correction lens system capable of correcting the foregoing chromatic aberration.

REFERENCE SIGNS LIST

1 Imaging device
1A Imaging device
32 Pupil projection lens
40 Inverted microscope
41 Image forming lens
43 Objective optical system
43A Objective optical system
43B Objective optical system
43C Objective optical system
50 OCT unit
90 OCT unit
70 Upright microscope
71 Image forming lens
73 Objective optical system
73A Objective optical system
100 Lens barrel
101 Convex mirror
102 Concave mirror
103 Cover member
103a Incidence surface
103b Emission surface
104 Water receiving member
104a First end portion
105 Supply tube
111 Ultrasound detector
120 Cover member
120a Incidence surface
120b Emission surface
200 Optical member
200a First surface
200b Second surface
201 Ultrasound detector
202 Water receiving member
202a First end portion
203 Suction tube
210 Objective optical system
211 Reflection surface
220 Objective optical system
221 Prism
222 Reference light lens barrel
230 Objective optical system
231a to 231c Optical fiber sensor
CA Central portion
CF Culture solution
P Focal position
Q1 Internal space
RS1 Reflection surface
RS2 Reflection surface
SP Sample
WT Liquid

The invention claimed is:

1. An objective optical system comprising:
   a convex reflection portion which reflects light traveling toward a sample;
   a concave reflection portion which reflects light reflected by the convex reflection portion toward the sample;
   a transmission portion which is disposed on an optical path of light reflected by the concave reflection portion, which has a liquid contact surface coming into contact with liquid interposed between the liquid contact surface and the sample, and of which the liquid contact surface is formed to be substantially orthogonal to the optical path of light reflected by the concave reflection portion; and
   a detector which is provided in the convex reflection portion on the object side and detects acoustic waves obtained by irradiating the sample with light.

2. The objective optical system according to claim 1, wherein the liquid contact surface is formed as a substantially spherical surface, and
   wherein a center of curvature on the spherical surface is substantially equivalent to a focal position of a reflection optical system formed of the convex reflection portion and the concave reflection portion.

3. The objective optical system according to claim 2, wherein a radius r of curvature at an arbitrary point on the liquid contact surface satisfies a relational expression $0.7\ S \leq r \leq 1.3\ S$ in case that a distance from the point to the focal position is S.

4. The objective optical system according to claim 1, wherein the liquid contact surface is a spherical surface or an aspherical surface.

5. The objective optical system according to claim 1, wherein the transmission portion is provided in a cover member having an incidence surface on which light reflected by the concave reflection portion is incident and an emission surface through which light incident on the incidence surface is emitted, and
wherein the emission surface of the cover member serves as the liquid contact surface.

6. The objective optical system according to claim 5, wherein the incidence surface of the cover member is formed to be substantially orthogonal to the optical path of light reflected by the concave reflection portion.

7. The objective optical system according to claim 5, wherein the convex reflection portion is formed in a middle portion on the incidence surface of the cover member, or a convex mirror having the convex reflection portion is attached to the middle portion.

8. The objective optical system according to claim 1 further comprising:
an optical member which has a first surface on which the convex reflection portion is formed in a middle portion and the transmission portion is provided in a surrounding portion, and a second surface on which light traveling toward the sample is incident on a middle portion and the concave reflection portion is formed in a surrounding portion.

9. The objective optical system according to claim 8 further comprising:
a lens barrel which internally supports the optical member having the first surface toward the object side.

10. The objective optical system according to claim 1, wherein a central portion of the convex reflection portion has a lower reflection factor than other parts of the convex reflection portion.

11. The objective optical system according to claim 1 further comprising:
a reference light reflection portion which reflects a part of the light and returns the part of the light to a side opposite to the sample as reference light for causing optical interference.

12. The objective optical system according to claim 11, wherein an optical path length to the reference light reflection portion and an optical path length to a focal position of a reflection optical system formed of the convex reflection portion and the concave reflection portion differ from each other.

13. The objective optical system according to claim 11, wherein the reference light reflection portion is provided on the incidence surface of the transmission portion and reflects a part of light incident on the incidence surface.

14. The objective optical system according to claim 1 further comprising:
an optical fiber-type detector which is provided in a vicinity of the liquid contact surface and detects acoustic waves obtained by irradiating the sample with light.

15. A microscope system comprising:
a microscope which has the objective optical system according to claim 1 and an image forming lens combined with the objective optical system; and
a correction lens system which corrects an aberration caused by a combination of the objective optical system and the image forming lens.

16. An objective optical system comprising:
a convex reflection portion which reflects light traveling toward a sample;
a concave reflection portion which reflects light reflected by the convex reflection portion toward the sample;
a transmission portion which is disposed on an optical path of light reflected by the concave reflection portion, which has a liquid contact surface coming into contact with liquid interposed between the liquid contact surface and the sample, and of which the liquid contact surface is formed to be substantially orthogonal to the optical path of light reflected by the concave reflection portion;
a lens barrel which internally supports a concave mirror having the concave reflection portion; and
a liquid holding member which supports the cover member such that an internal space is partitioned by the cover member, which has a first end portion and a second end portion, of which the first end portion is attached to an end portion of the lens barrel on an object side, and which is capable of holding a liquid in an internal space on the second end portion side partitioned by the cover member,
wherein the transmission portion is provided in a cover member having an incidence surface on which light reflected by the concave reflection portion is incident and an emission surface through which light incident on the incidence surface is emitted,
wherein the emission surface of the cover member serves as the liquid contact surface.

17. The objective optical system according to claim 16 further comprising:
a liquid supply portion which supplies a liquid to the internal space on the second end portion side partitioned by the cover member.

18. The objective optical system according to claim 16, wherein the convex reflection portion is formed in a middle portion on the incidence surface of the cover member, or a convex mirror having the convex reflection portion is attached to the middle portion.

19. An objective optical system comprising:
a convex reflection portion which reflects light traveling toward a sample;
a concave reflection portion which reflects light reflected by the convex reflection portion toward the sample;
a transmission portion which is disposed on an optical path of light reflected by the concave reflection portion, which has a liquid contact surface coming into contact with liquid interposed between the liquid contact surface and the sample, and of which the liquid contact surface is formed to be substantially orthogonal to the optical path of light reflected by the concave reflection portion;
an optical member which has a first surface on which the convex reflection portion is formed in a middle portion and the transmission portion is provided in a surrounding portion, and a second surface on which light traveling toward the sample is incident on a middle portion and the concave reflection portion is formed in a surrounding portion;
a lens barrel which internally supports the optical member having the first surface toward the object side; and
a tubular liquid holding member of which a first end portion is attached to an end portion of the lens barrel on an object side and which is capable of holding a liquid in an internal space.

20. The objective optical system according to claim 19 further comprising:
  a liquid introduction portion which introduces a liquid into the internal space.

\* \* \* \* \*